United States Patent
Xiong et al.

(10) Patent No.: US 10,966,236 B2
(45) Date of Patent: Mar. 30, 2021

(54) SCHEDULING AND HYBRID AUTOMATIC REPEAT REQUEST OPERATION FOR CARRIER AGGREGATION WITH MIXED NUMEROLOGIES

(71) Applicant: Apple Inc., Cupertino, CA (US)

(72) Inventors: Gang Xiong, Portland, OR (US); Hong He, Sunnyvale, CA (US); Ajit Nimbalker, Fremont, CA (US); Joonyoung Cho, Portland, OR (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/465,530

(22) PCT Filed: Mar. 22, 2018

(86) PCT No.: PCT/US2018/023901
§ 371 (c)(1),
(2) Date: May 30, 2019

(87) PCT Pub. No.: WO2018/175820
PCT Pub. Date: Sep. 27, 2018

(65) Prior Publication Data
US 2020/0022175 A1    Jan. 16, 2020

Related U.S. Application Data

(60) Provisional application No. 62/476,053, filed on Mar. 24, 2017, provisional application No. 62/475,475, filed on Mar. 23, 2017.

(51) Int. Cl.
*H04W 72/12* (2009.01)
*H04L 1/18* (2006.01)
(Continued)

(52) U.S. Cl.
CPC ....... *H04W 72/1289* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS

2013/0201964 A1    8/2013   Kim et al.
2016/0212734 A1*   7/2016   He .......................... H04L 5/14
(Continued)

OTHER PUBLICATIONS

CATT, "Considerations for HARQ Processing Time and Number of Processes," R1-1702102, 3GPP TSG RAN WG1 Meeting #88, Athens Greece, Feb. 7, 2017 (3 pages).
(Continued)

*Primary Examiner* — Otis L Thompson, Jr.
(74) *Attorney, Agent, or Firm* — Eschweiler & Potashnik, LLC

(57) ABSTRACT

An apparatus of a base station, system and method. The apparatus includes a memory and processing circuitry configured to: determine a physical downlink control channel (PDCCH) on a first component carrier; encode a first signal to be transmitted on the PDCCH, the first signal including downlink control information (DCI) on resources for a second signal to be transmitted on a second component carrier, wherein the DCI is based on a predetermined numerology, and wherein respective numerologies of the first component carrier and the second component carrier are different from one another. The processing circuitry is further to cause transmission of the first signal on the PDCCH, wherein a receiver of the second signal is to process the second signal based on the control information in the first signal.

23 Claims, 22 Drawing Sheets

(51) Int. Cl.
    *H04L 5/00*  (2006.01)
    *H04W 72/04*  (2009.01)

(52) U.S. Cl.
    CPC ......... *H04L 5/0055* (2013.01); *H04W 72/042*
        (2013.01); *H04W 72/0413* (2013.01); *H04W*
        *72/0453* (2013.01)

(56) References Cited

U.S. PATENT DOCUMENTS

| | | | |
|---|---|---|---|
| 2017/0251500 A1* | 8/2017 | Agiwal | H04W 48/12 |
| 2018/0092089 A1* | 3/2018 | Yin | H04W 72/0406 |
| 2018/0206258 A1* | 7/2018 | Hosseini | H04W 72/1252 |
| 2019/0037561 A1* | 1/2019 | Jung | H04L 5/0055 |
| 2019/0053219 A1* | 2/2019 | Tiirola | H04L 1/1854 |
| 2019/0081762 A1* | 3/2019 | Yang | H04W 76/28 |
| 2019/0103943 A1* | 4/2019 | Wang | H04L 1/1854 |
| 2019/0159206 A1* | 5/2019 | Sun | H04L 1/1896 |
| 2019/0230685 A1* | 7/2019 | Park | H04W 72/12 |
| 2020/0022098 A1* | 1/2020 | Takeda | H04L 1/1861 |

OTHER PUBLICATIONS

CATT, "HARQ and Scheduling Timing Design for LTE sTTI," R1-1702056, 3GPP TSG RAN WG1 Meeting #88, Athens, Greece, Feb. 7, 2017 (6 pages).

Huawei et al., "Signaling Design for HARQ TIMING," R1-170335, 3GPP TSG RAN WG1 Meeting 88, Athens, Greece, Feb. 6, 2017. (3 pages).

LG Electronics, "Discussion on Scheduling and HARQ Feedback for NR," R1-1702486, 3GPP TSG WG1 Meeting #88, Athens, Greece, Feb. 7, 2017. (9 pages).

PCT International Search Report and Written Opinion in PCT International Application Serial No. PC/TUS2018/023901 dated Jul. 6, 2018 (11 pages).

* cited by examiner

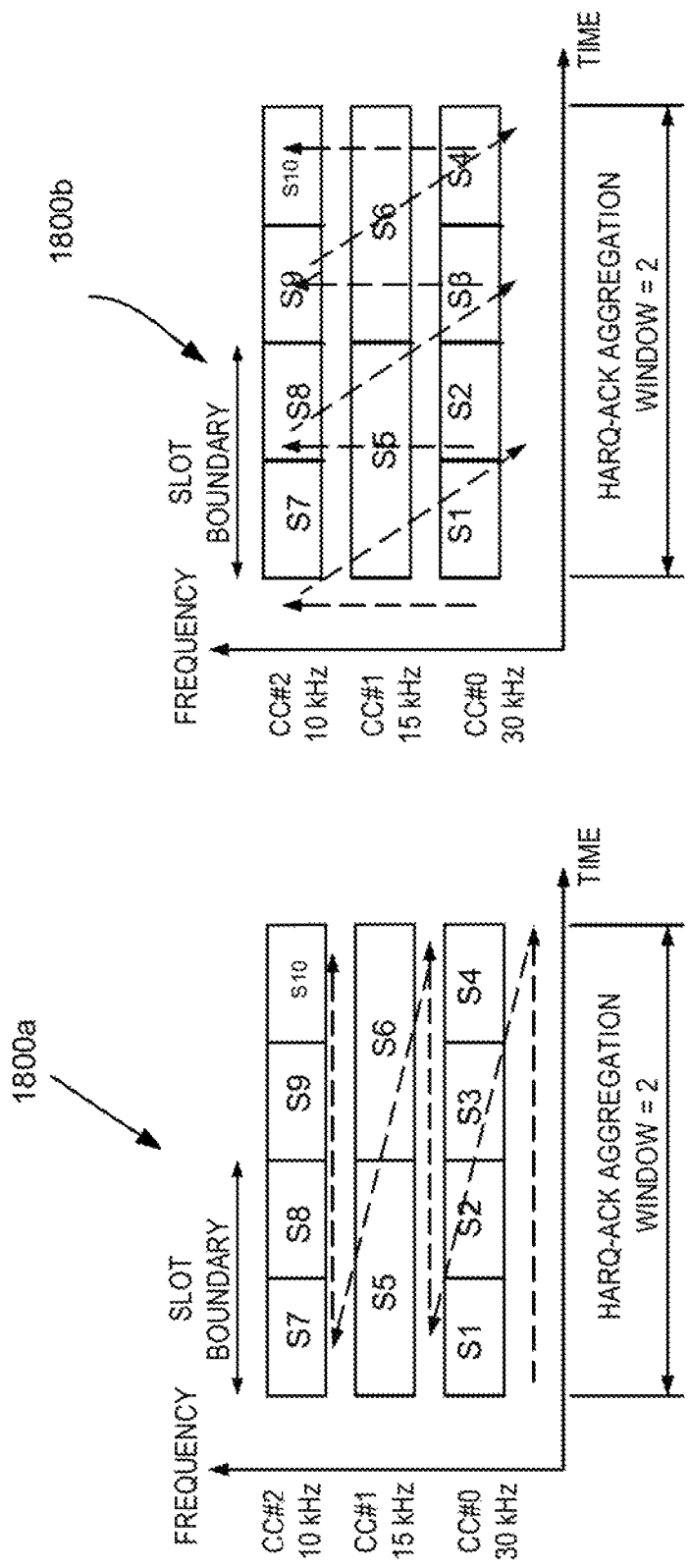

SCHEDULING AND HYBRID AUTOMATIC REPEAT REQUEST OPERATION FOR CARRIER AGGREGATION WITH MIXED NUMEROLOGIES

CROSS REFERENCE TO RELATED APPLICATION

This application is a national stage application under 35 U.S.C. § 371 of PCT International Application Serial No. PCT/US2018/023901, filed on Mar. 22, 2018 and entitled SCHEDULING AND HYBRID AUTOMATIC REPEAT REQUEST OPERATION AND CODEBOOK DESIGN FOR NEW RADIO CARRIER AGGREGATION, which application claims the benefit of and priority from U.S. Provisional Patent Application No. 62/475,475 entitled "Scheduling And Hybrid Automatic Repeat Request Operation For Carrier Aggregation With Mixed Numerologies," filed Mar. 23, 2017, and from U.S. Provisional Patent Application No. 62/476,053 entitled "Hybrid Automatic Repeat Request Acknowledgement (HARQ-ACK) Codebook Design For New Radio (NR) Carrier Aggregation (CA)," filed Mar. 24, 2017. The disclosures of the prior Applications are considered part of and are incorporated by reference in their entirety in the disclosure of this Application.

TECHNICAL FIELD

This disclosure generally relates to the use of New Radio carrier aggregation using the same or mixed numerologies as between component carriers.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third-generation partnership project (3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the eNodeB to the UE via a physical downlink shared channel (PDSCH). A physical downlink control channel (PDCCH) may be used to provide control information regarding a downlink PDSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

BRIEF DESCRIPTION OF THE DRAWINGS

FIG. 18a is a NR signaling diagram illustrating another embodiment for cross-carrier multiple-slot scheduling involving a HARQ-ACK feedback with its bits ordered in the UCI in a time first frequency second manner;

FIG. 18b is a NR signaling diagram illustrating another embodiment for cross-carrier multiple-slot scheduling involving a HARQ-ACK feedback with its bits ordered in the UCI in a frequency first time second manner;

DETAILED DESCRIPTION

Figure 1:
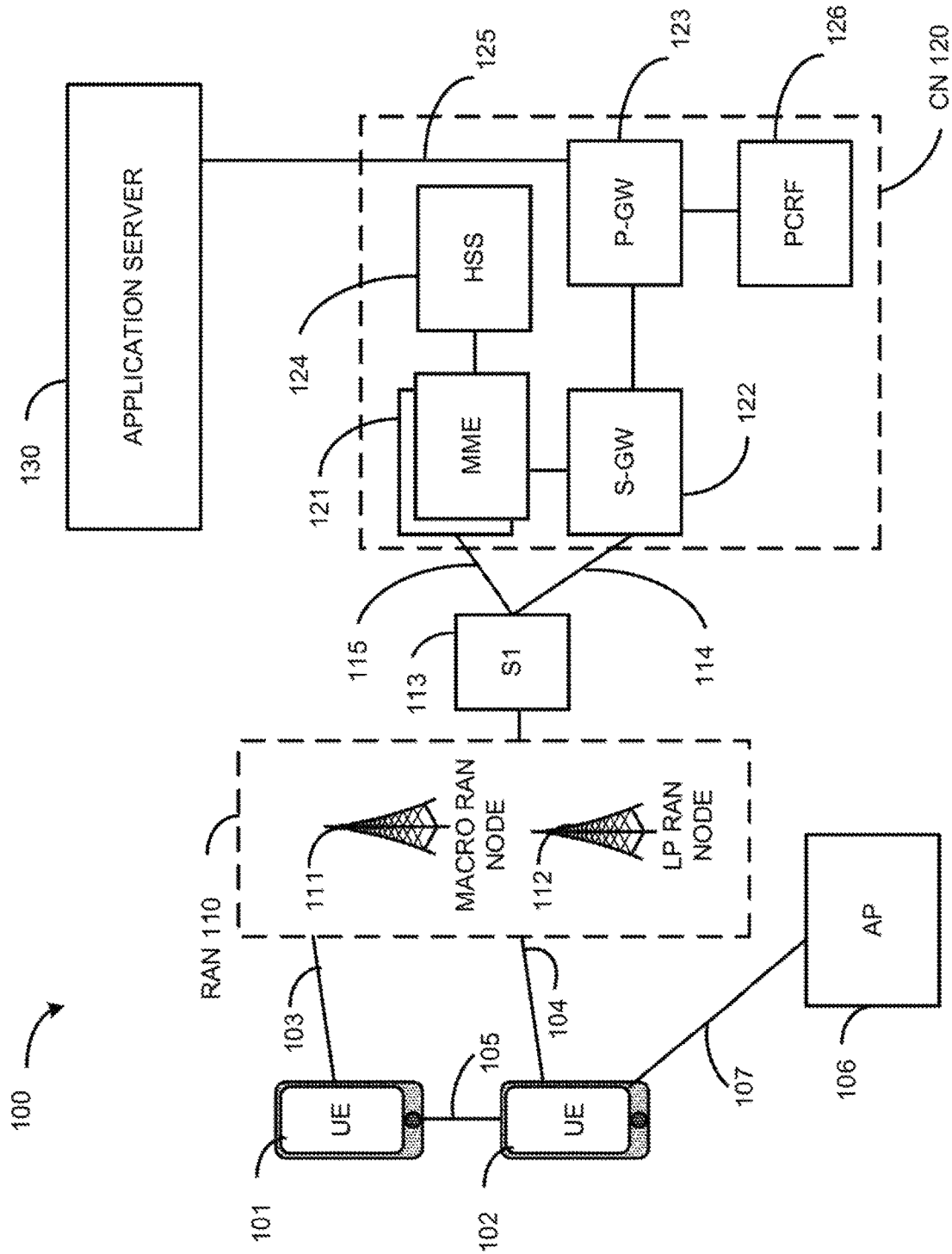
FIG. 1 illustrates an architecture of a system 100 of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or NR will provide access to information and sharing of data anywhere, anytime by various users and applications. NR is expected to be a unified network/system that targets to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATS) to enrich people's lives with better, simpler and more seamless wireless connectivity solutions. NR will enable everything connected by wireless and deliver fast, rich content and services.

For NR systems, high frequency band communication (that is, communication in bands above a 6 GHz center frequency) has attracted significant attention from the industry recently, since it provides wider bandwidth to support future integrated communication systems. Beamforming represents a critical technology for the implementation of high frequency band systems since beamforming gain may compensate for severe path losses caused by atmospheric attenuation, may improve the signal-to-noise ratio (SNR), and may enlarge the coverage area. By aligning the transmission beam to the target user equipment (UE), radiated energy may focused for higher energy efficiency, and mutual UE interference may be suppressed.

Embodiments pertain in general to a device, system and method to provide an indication, within a first transmission in one CC, of location information regarding a second transmission in another CC. According to one embodiment, the indication may include a scheduling indication within control information in a PDCCH in one CC with respect to a timing of a corresponding data transmission in a PDSCH in another different CC, where the CC's may have mixed numerologies. According to another embodiment, the indication may include an indication, within control information in a PUCCH in one CC, of a size and order of bits of a HARQ-ACK feedback signal or HARQ-ACK signal in another CC, the HARQ-ACK feedback being for a data transmission within a PDSCH corresponding to the control information in the PDCCH.

Long Term Evolution (LTE) Release 10 (Rel-10) introduced and supports cross-carrier scheduling, where physical downlink shared channel (PDSCH) and physical uplink shared channel (PUSCH) are scheduled on a component carrier (CC) that is distinct from the CC on which physical downlink control channel (PDCCH) is scheduled. In particular, for cross-carrier scheduling, carrier indication field (CIF) in the downlink control information (DCI) of the PDCCH is used in Rel-10 to indicate which CC is used for the data transmission on PDSCH and PUSCH.

For NR, similar mechanism for cross-carrier scheduling may be considered. The main advantages include, among others: (1) control channel interference mitigation; (2) assistance from low band (e.g., carrier frequency below 6 GHz) to schedule the data transmission at high band (e.g., carrier frequency above 6 GHz)—given that transmission on low band is more robust than that on high band, it may be desirable to transmit the PDCCH in low band to achieve better link budget; (3) UE power consumption reduction by monitoring a limited number of CCs for DCI; and (4) control channel congestion avoidance on one CC.

However, due to the fact that different numerologies or Transmission Time Interval (TTI) durations may be applied for transmission on different CCs in NR, certain enhancements on cross-carrier scheduling may be considered, especially considering the case when PDCCH at low band is used to schedule the data transmission at high band.

Some embodiments herein may include scheduling and hybrid automatic repeat requests (HARQ) operation for carrier aggregation with mixed numerologies for NR.

First, example networks and architectures that may be used to implement some demonstrative embodiments will be shown and described with respect to FIGS. 1-4 below.

In particular, FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 may comprise an Internet of Things (IoT) UE, which may comprise a network access layer designed for low-power IoT applications utilizing short-lived UE connections. An IoT UE may utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a Next Gen RAN (NG RAN), or some other type of RAN. The UEs 101 and 102 utilize connections 103 and 104, respectively, each of which comprises a physical communications interface or layer (discussed in further detail below). In this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes that enable the connections 103 and 104. These access nodes (ANs) may be referred to as base stations (BSs), NodeBs, evolved NodeBs (eNBs), next Generation NodeBs (gNB), RAN nodes, and so forth, and may comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 may terminate the air interface protocol and may be the first point of contact for the UEs 101 and 102. In some embodiments, any of the RAN nodes 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 may be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may comprise a plurality of orthogonal subcarriers.

In some embodiments, a downlink resource grid may be used for downlink transmissions from any of the RAN nodes 111 and 112 to the UEs 101 and 102, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently may be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information, in the form of control information, about the transport format and resource allocations related to the PDSCH, among other things. It may also inform the UEs 101 and 102 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
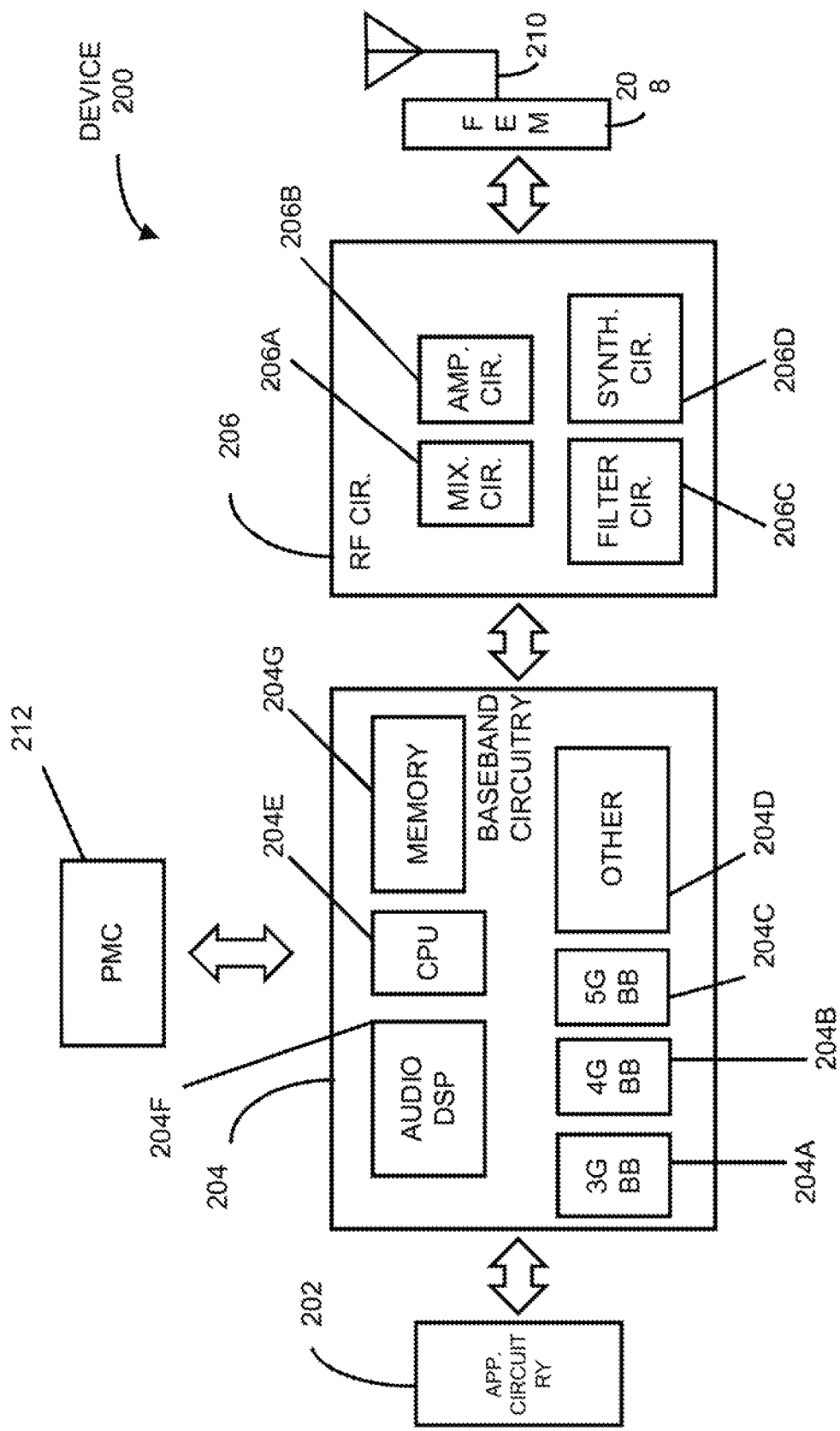
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together as shown by way of example. The components of the illustrated device 200 may be included in a UE or a RAN node. In some embodiments, the device 200 may include less elements (e.g., a RAN node may not utilize application circuitry 202, and instead include a processor/controller to process IP data received from an EPC or Evolved Packet Core. In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include processing circuitry such as, but not limited to, one or more single-core or multi-core processors. The baseband circuitry 204 may include one or more baseband processors, and one or more memories for storing instructions or control logic, the memories coupled to the baseband processors, the baseband processors to implement the control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. The baseband processing circuitry 204 may therefore cause transmission of data or control information by generating signals that could prompt the RF circuitry and antennas to transmit the data or control information. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a Low Noise Amplifier LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 2021104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
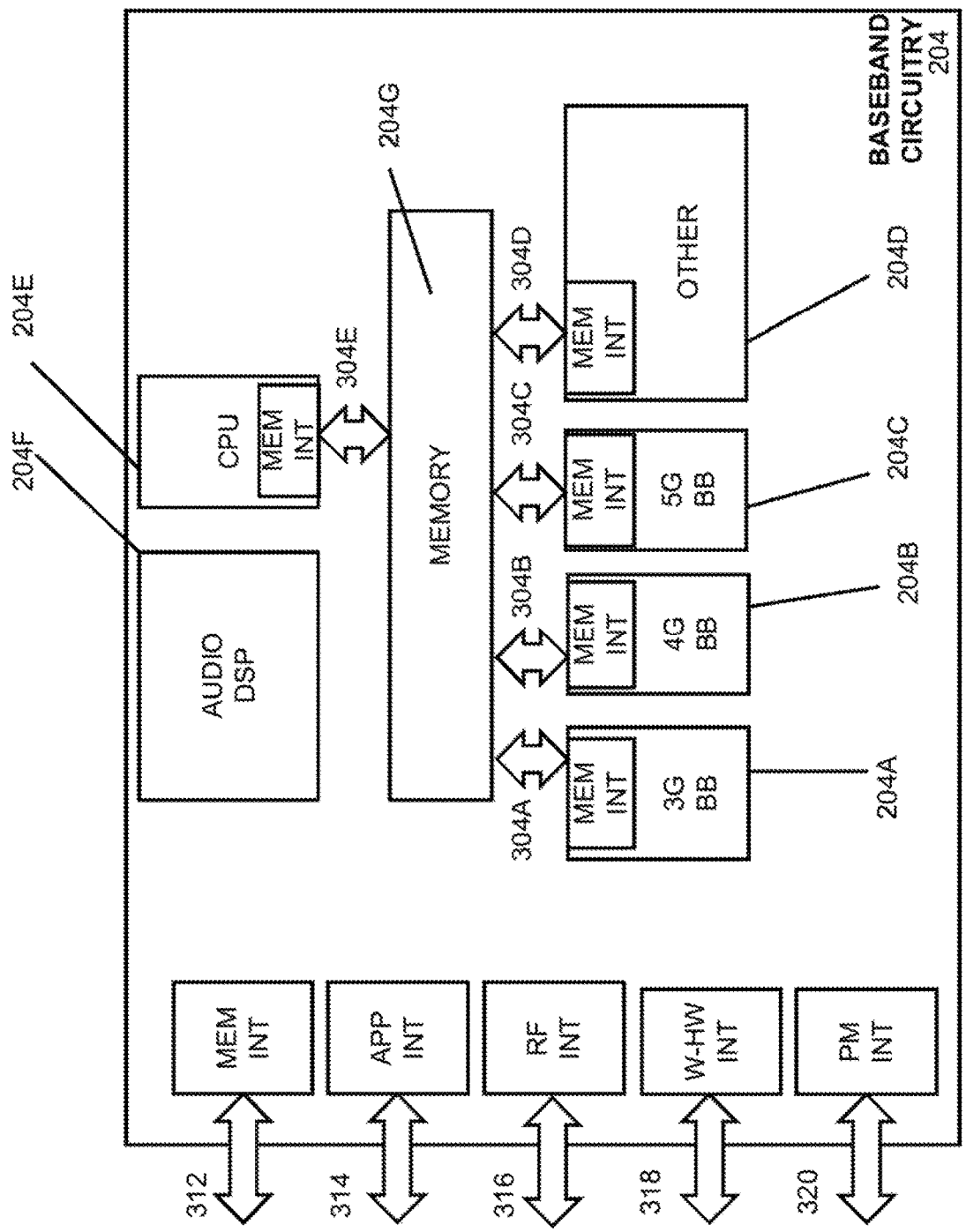
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
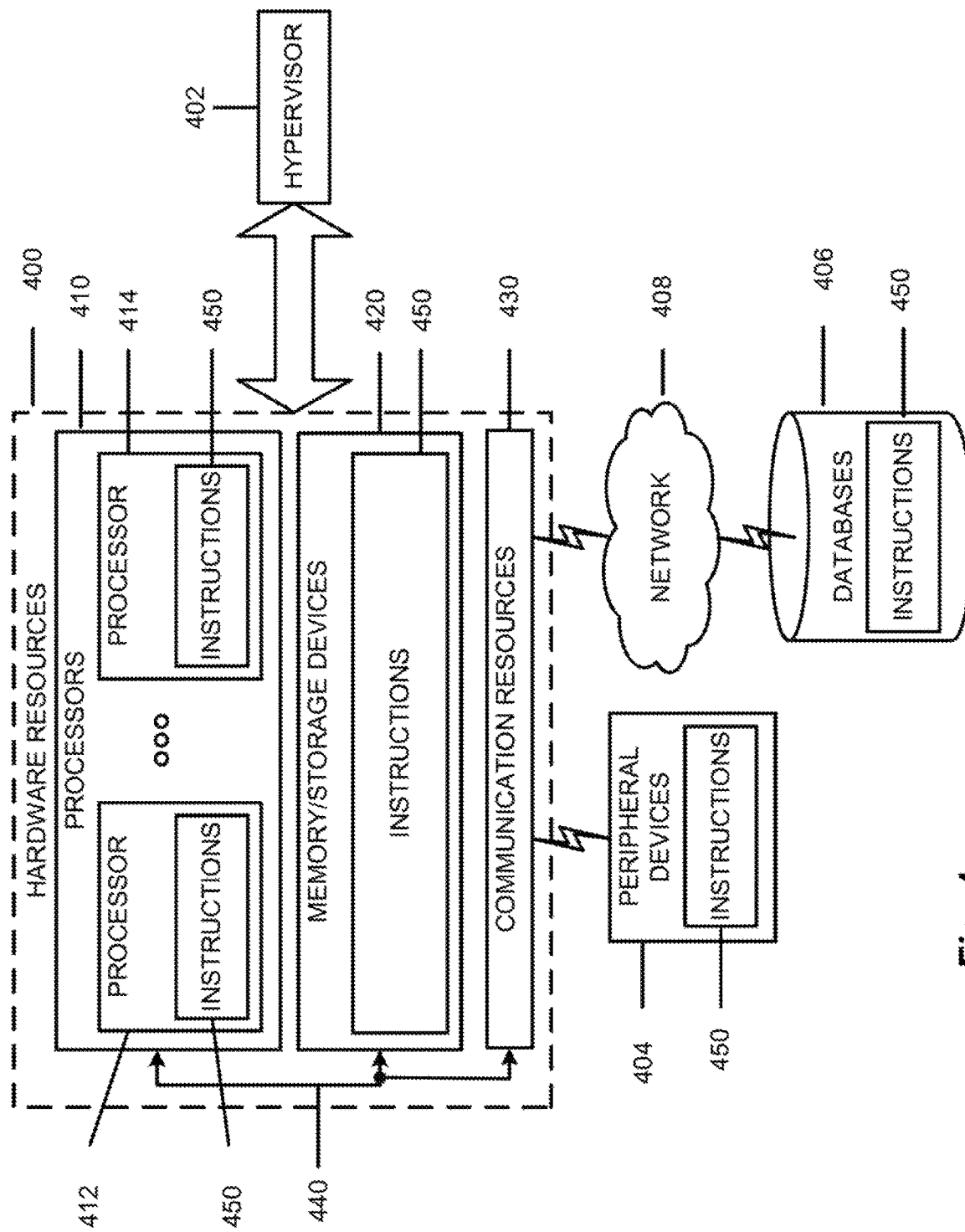
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440. For embodiments where node virtualization (e.g., NFV) is utilized, a hypervisor 402 may be executed to provide an execution environment for one or more network slices/sub-slices to utilize the hardware resources 400

The processors 410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 412 and a processor 414.

The memory/storage devices 420 may include main memory, disk storage, or any suitable combination thereof. The memory/storage devices 420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 430 may include interconnection or network interface components or other suitable devices to communicate with one or more peripheral devices 404 or one or more databases 406 via a network 408. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

In some embodiments, the electronic device(s), network(s), system(s), chip(s) or component(s), or portions or implementations thereof, of FIGS. 1-4, or some other figure herein may be configured to perform one or more processes, techniques, or methods as described herein in relation to embodiments, or portions thereof.

According to some demonstrative embodiments, a device, system and method are to include in a first transmission in a first CC of control information including an indication of timing information for a second transmission in a second CC, where the indication is based on a subcarrier spacing of one of the first CC and the second CC. According to one embodiment, the first CC and the second CC have different subcarrier spacings.

In some embodiments, the indication may include scheduling information, and the second transmission may include a data transmission of a PDSCH or a HARQ-ACK feedback of a PUCCH. These latter embodiments are set forth in more detail in the section of this instant description entitled "*Cross Carrier Scheduling with Mixed Numerologies or TTI Durations as Between a First CC Carrying a PDCCH and a second CC carrying the corresponding PDSCH*," and subsection "HARQ-ACK feedback on PCell with different numerologies or TTI durations from SCell."

In alternative embodiments, the indication may include HARQ-ACK codebook information. In one embodiment, the second transmission may include a data transmission of a PDSCH. These latter embodiments are set forth in more detail below in the section of this instant description entitled "*HARQ-ACK Codebook Design for NR Carrier Aggregation*," with subsections "Semi-Static HARQ-ACK Codebook for Carrier Aggregation with Same or Mixed Numerologies or TTI Durations" and "Dynamic HARQ-ACK Codebook for Carrier Aggregation with Same or Mixed Numerologies or TTI Duration."

According to one embodiment, the first transmission may include a DCI in a PDCCH.

In the instant description, a slot index is referred to as Sn, where n corresponds to the slot number. Therefore, by way of example, slot index 1 will be referred to as S1 and so forth. In addition, the slots according to embodiments may include 14 symbols, or any other number of symbols.

Cross-Carrier Scheduling with Mixed Numerologies or TTI Durations as Between a First CC Carrying a PDCCH and a Second CC Carrying the Corresponding PDSCH:

According to some demonstrative embodiments, mechanisms are provided for cross-carrier scheduling with mixed numerologies or TTI durations. Such scheduling includes the scheduling of a data transmission of a PDSCH on one CC where the corresponding control information of a PDCCH is on another CC with a different numerology, and scheduling HARQ-ACK feedback on the primary cell (PCell) with different numerologies or TTI durations from the secondary cell (SCell)

According to some demonstrative embodiments, in cases of cross-carrier scheduling, the NR control channel (e.g. PDCCH) on one CC may be used to schedule the data transmission on a distinct/different CC. To enable cross-carrier scheduling, the carrier indication field (CIF) in the DCI of the PDCCH may indicate which CC is used for data transmission, that is, for transmission of the PDSCH or PUSCH. Given that different numerologies or subcarrier spacings may be employed for different CCs in NR, numerology or subcarrier spacing for a scheduled data transmission in another CC may be configured by high layer signaling, or dynamically indicated in the DCI, or a combination thereof. For NR, an agreement has been reached that symbol level alignment across different subcarrier spacings with the same Cyclic Prefix (CP) overhead should be maintained.

In some demonstrative embodiments described herein, although reference may sometimes be made only to a scheduled PDSCH, the described embodiments could be equally applicable to the scheduling of a PUSCH, as would be within the knowledge of one skilled in the art.

Figure 5:
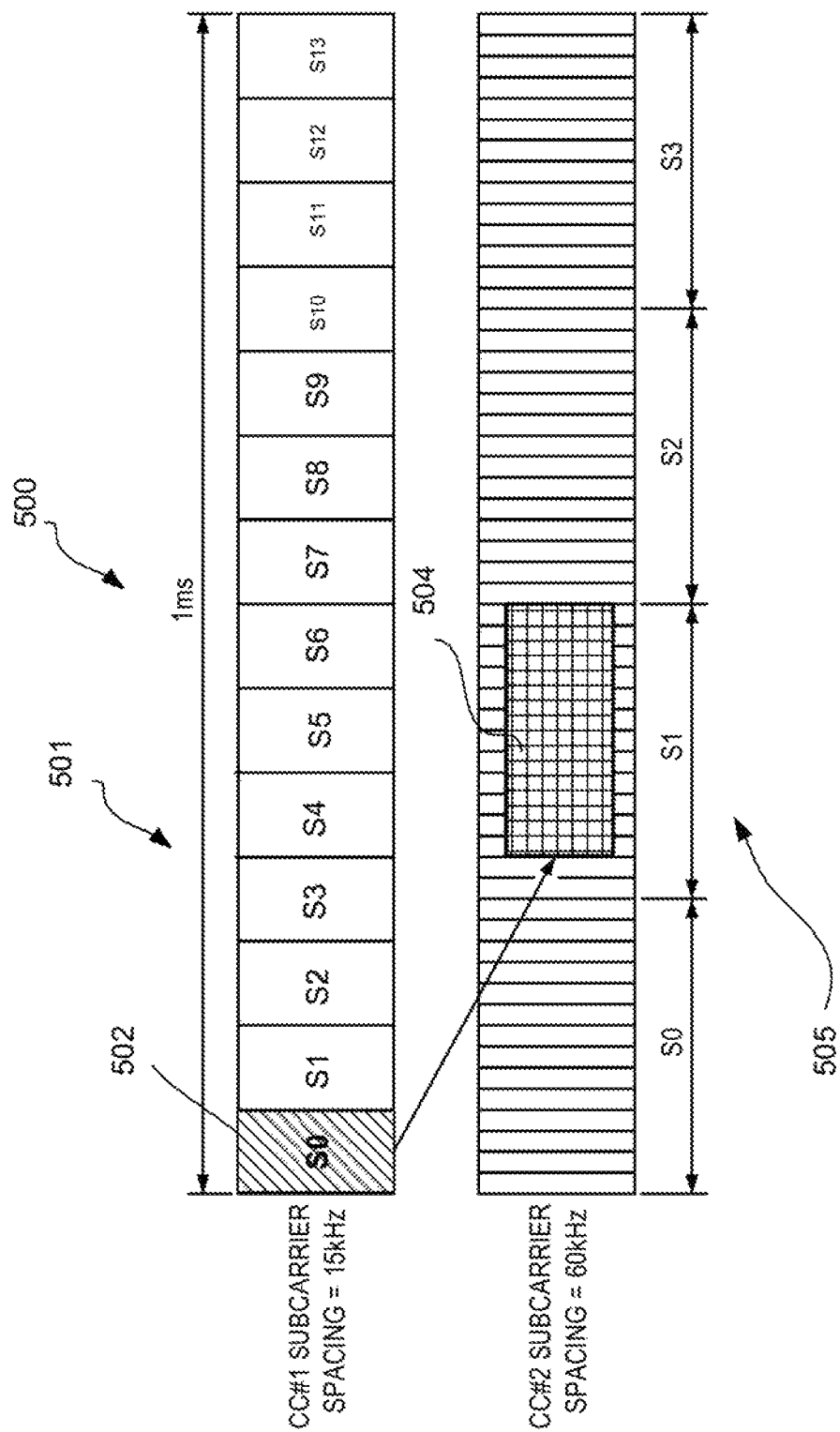
FIG. 5 is a New Radio (NR) signaling diagram illustrating one embodiment of cross-carrier scheduling with different numerologies in two CCs using slot indices.
Figure 6:
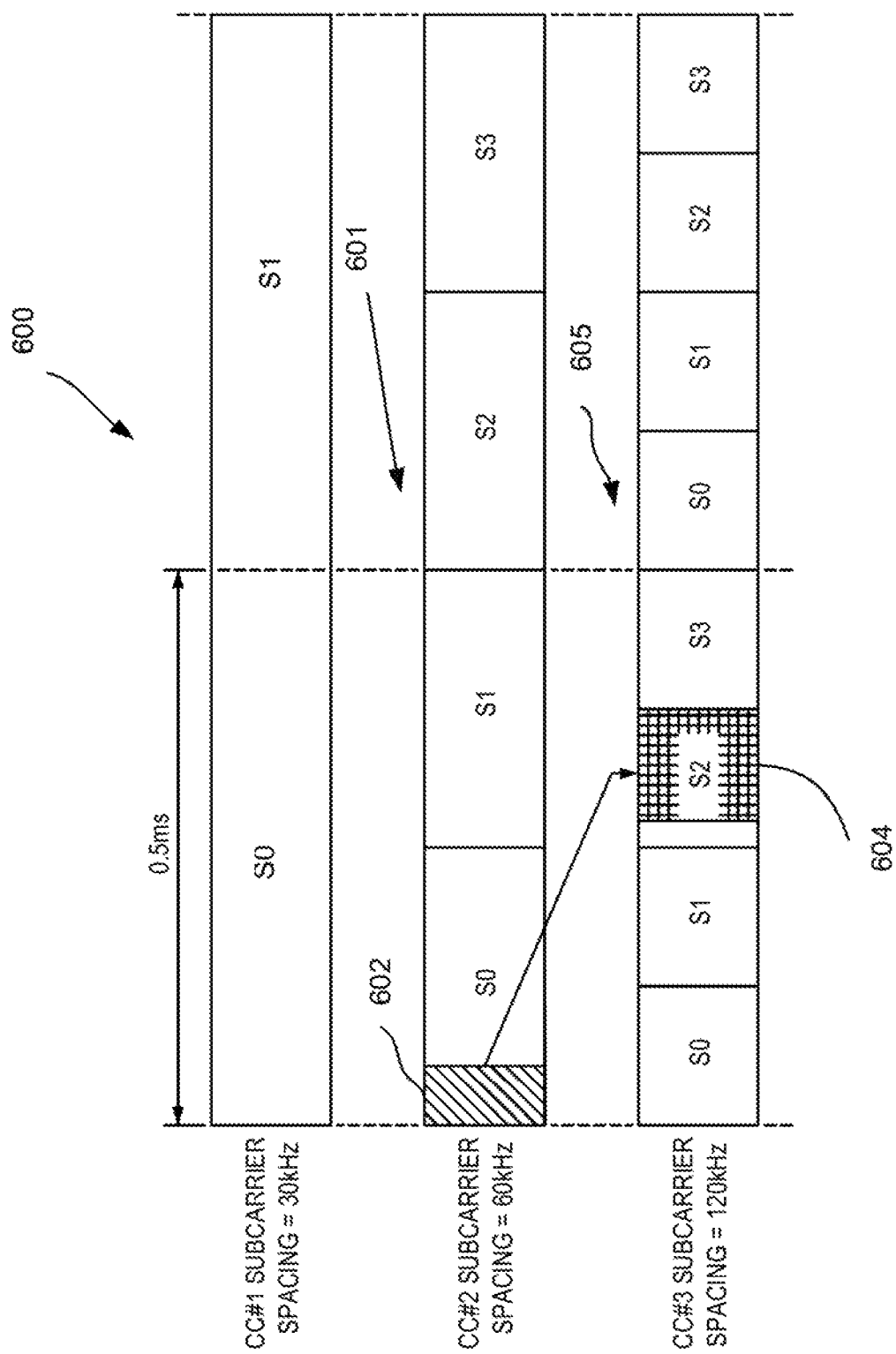
FIG. 6 is a NR signaling diagram illustrating another embodiment of cross carrier scheduling with different numerologies in CCs using slot indices.
Figure 7:
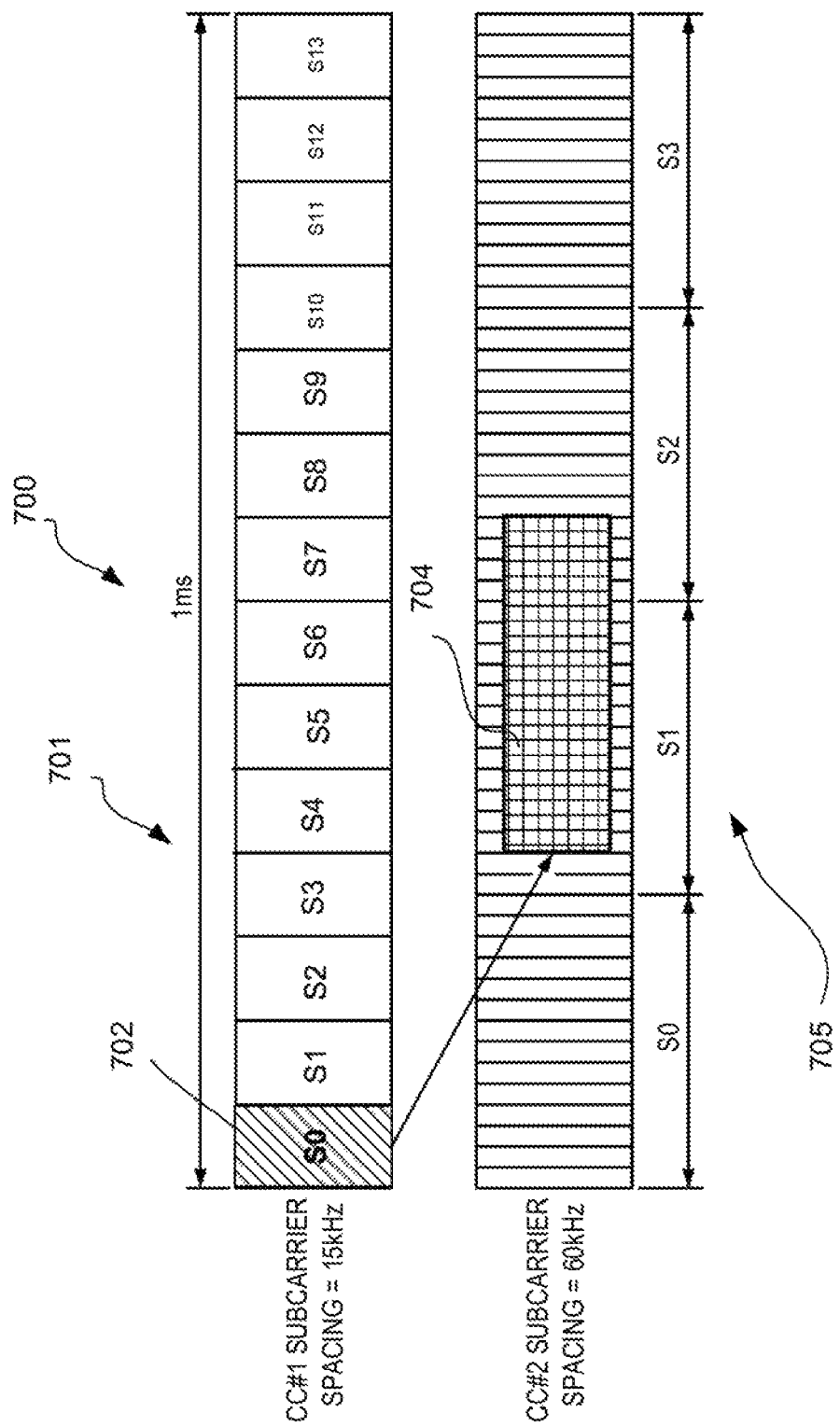
FIG. 7 is a NR signaling diagram illustrating an embodiment where cross-carrier scheduling is based on the mini-slot principle.

Reference will now be made to FIGS. 5-7, which show different embodiments for indicating scheduling information in the form of slot indices in control information of a PDCCH on a first CC, the scheduling information concerning a data transmission of a PDSCH or of a PUSCH in a second CC distinct from and having a different numerology with respect to the first CC. Embodiments may include use of slot indices in case of cross-carrier scheduling with different numerologies or TTI durations, which slot indices may be explicitly indicated in the DCI or configured by high layer signaling via radio resource control (RRC) signaling for the scheduling of the data transmission of a PDSCH or PUSCH. In each case, it becomes useful, when indicating the slot index for the upcoming PDSCH or PUSCH transmission on the second CC, to define the slot index in terms of the numerology of a known/predetermined CC (in terms of a predetermined numerology) as a point of reference in order to practically allow indication of the scheduling in terms of the time granularity as dictated by the subcarrier spacing in the known/predetermined CC.

FIG. 5 is a NR signaling diagram 500 illustrating one embodiment of cross-carrier scheduling with different numerologies in two CCs using slot indices. In the shown example, 15 kHz and 60 kHz subcarrier spacings are used in CC #1 and CC #2, respectively. Therefore, slot duration for CC #1 shown as slot 501 is 1 millisecond (ms) and for CC #2 shown as 4 slots 505 is roughly 0.25 ms. Further, it is shown that PDCCH control transmission (that is, a transmission including control information) 502 at CC #1 may be used to schedule the PDSCH or PUSCH data transmission 504 at CC #2 in S1 of CC #2. As shown by way of example in FIG. 5, each of Slots 501 and 505 may include 14 symbols, or any other number of symbols. In the case of CC #1, the slot duration for slot 501 corresponds to a subframe duration of 1 ms, whereas in CC #2, there are 4 slots 505, S0, S1, S2 and S3.

In some demonstrative embodiments, the slot index to indicate the slot scheduling in another CC may be defined in a number of exemplary ways: (1) in accordance with one subframe boundary or the slot boundary using the smallest subcarrier spacing in two CCs for PDCCH or scheduled data transmission (in the case of FIG. 5, for example, using the 1 ms subcarrier spacing of CC #1); (2) in accordance with the subcarrier spacing in the CC where either the PDCCH or the data channel is transmitted (in the case of FIG. 5, for example, using the 1 ms subframe boundary where the PDSCH is transmitted, which is aligned with the slot boundary for CC #2); or (3) in accordance with the slot boundary with smallest subcarrier spacing within the configured CCs (to be explained further below in relation to FIG. 6).

Referring still to FIG. 5, therefore, the scheduling of the PDSCH or PUSCH data transmission 504 may be explicitly indicated in the DCI within PDCCH 502, configured via higher layer signaling via RRC signaling, and may indicate a slot index defined in relation to the subcarrier spacing of a predetermined CC as noted above.

Referring now to FIG. 6, a NR signaling diagram 600 is shown illustrating an embodiment of cross carrier scheduling with different numerologies in CCs using slot indices to indicate the scheduling. According to some demonstrative embodiments, slot index may be derived in accordance with the slot boundary with the smallest subcarrier spacing within configured CCs. In the shown example, 30 kHz, 60 kHz and 120 kHz subcarrier spacings are used in CC #1, CC #2 and CC #3, respectively. Therefore, slot duration for CC #1 shown as slot 601 is 0.5 millisecond (ms), for CC #2 shown as 4 slots 605 is roughly 0.25 ms, and for CC #3 shown as 8 slots 607 is roughly 0.125 ms. Further, it is shown that PDCCH control transmission 602 at CC #2 may be used to schedule the PDSCH data transmission 604 at CC #3 in S2 of CC #3.

Referring still to FIG. 6, CC #1 may have the smallest subcarrier spacing out of the three configured CCs, although CC #1 is not used for transmission of either the PDCCH or the PDSCH, which spacing is 30 kHz. In this case, the slot boundary may be aligned with 0.5 ms in CC #1, that is, in accordance with the slot boundary with the smallest subcarrier spacing within the configured CCs. Further, as shown in the figure, control transmission of PDCCH in S0 in CC #2 with 60 kHz subcarrier spacing may be used to schedule the data transmission in S2 in CC #3 with 120 kHz subcarrier spacing.

In other embodiments, a joint resource allocation field in DCI may indicate both the slot and the symbol within the slot assigned for the cross-carrier allocation. In one example, the resource block group used for allocating resources on a CC may be dependent on the CC bandwidth.

In other embodiments, when scheduling the data transmission on another CC with different numerologies or TTI durations, a "mini-slot principle" may be employed. According to such embodiments, when scheduling the data transmission for a second CC in a first CC, information in the first CC may indicate the schedule by explicitly indicating the starting symbol and the end symbol, or mini-slot index(s), of the data transmission being scheduled for the second CC. This indication may be in the DCI, where the symbol boundary is defined in a number of different ways: (1) in accordance with the smallest subcarrier spacing in two CCs for PDCCH or scheduled data transmission; (2) in accordance with an always a reference (e.g. 15 kHz) subcarrier spacing; or (3) in accordance with the subcarrier spacing in the CC where either the PDCCH or the data is transmitted. According to one embodiment, the starting symbol or end symbol may be signaled from a subset of symbol indices. For instance, a rule may be established according to which the starting symbol or end symbol may only be an even symbol, or an odd symbol.

Reference is now made to FIG. 7, which depicts one example, in the form of NR signaling diagram 700, of an embodiment where cross-carrier scheduling is based on the mini-slot principle. In the shown example, 15 kHz and 60 kHz subcarrier spacings are used in CC #1 and CC #2, respectively. It is shown that PDCCH control transmission 702 at CC #1 may be used to schedule the PDSCH or PUSCH data transmission 704 at CC #2 in symbols that corresponds to symbol #4 to symbol #7 of CC #1 (that is, in accordance with the subcarrier spacing of CC #1). In the case of CC #1, the slot duration for slot 701 corresponds to a subframe duration, whereas in CC #2, there are 4 slots 705, S0, S1, S2 and S3, each having 14 symbols as noted. The PDSCH or PUSCH data transmission 704 is scheduled to start at S1 and to span into S2. According to one embodiment, the slot index for the data, that is, for the PDSCH or PUSCH data transmission 704 on CC #2, may be implicitly derived from the information in PDCCH, where the PDCCH control transmission, aligned with the first slot of CC #2, and indicating symbol #'s in CC #2 that would span across S1 and S2 of CC #2, would allow the receiver of the data transmission to understand that the data transmission of the PDSCH or PUSCH is scheduled in S1 and S2 of CC #2.

In some demonstrative embodiments, in the case of cross-carrier and cross slot scheduling, the indication of a timing delay between the PDCCH control transmission and scheduled data transmission of PDSCH or PUSCH may be used to indicate scheduling of the data transmission. The timing delay may be configured via higher layer signaling, may be indicated as a combination of higher layer signaling and dynamic indication in the DCI, or may be explicitly indicated using the DCI only. Further, in some embodiments, the delay in slot defined in accordance with smallest subcarrier spacings in two CCs for control transmission in PDCCH or scheduled data transmission or always 15 kHz subcarrier spacing or in accordance with the subcarrier spacing in the CC where PDCCH or data channel is transmitted In some demonstrative embodiments, the timing may be defined in accordance with the subcarrier spacing in the CC where PDCCH may be transmitted. Further, the delay for scheduling timing may be derived according to Equation 1 as follows:

$$I_{delay} = \left\lfloor \frac{N_{delay}}{\Delta_f^{CC1}/\Delta_f^{CC2}} \right\rfloor \text{ or } I_{delay} = \left\lceil \frac{N_{delay}}{\Delta_f^{CC1}/\Delta_f^{CC2}} \right\rceil \qquad \text{Eq. (1)}$$

Where $\Delta_f^{CC1}$ and $\Delta_f^{CC2}$ may be the subcarrier spacings for CC #1 and CC #2 for the transmission of PDCCH and PDSCH or PUSCH, respectively, and $N_{delay}$ may be the scheduling timing delay with respect to slot boundary for CC #2. In Equation 1, the left side of the equation denotes a floor value, and the right side a ceiling value. A NR evolved NodeB (gNB) according to some embodiments may determine the scheduling timing delay based on the subcarrier spacings for first and second CCs and may configure the delay suitably for the UE operation.

Figure 10:
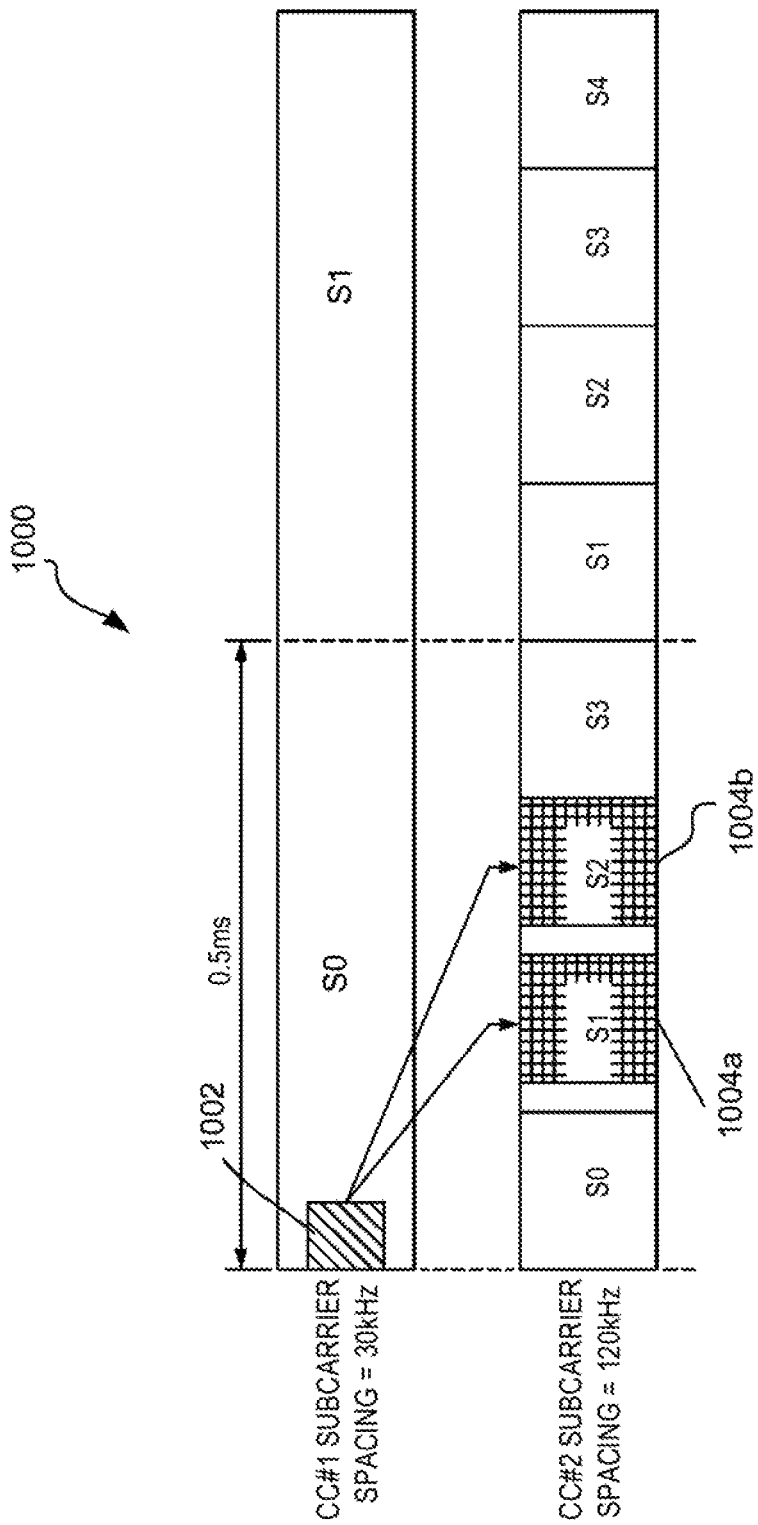
FIG. 10 is a NR signaling diagram illustrating an embodiment of cross-carrier multiple-slot scheduling.
Figure 11:
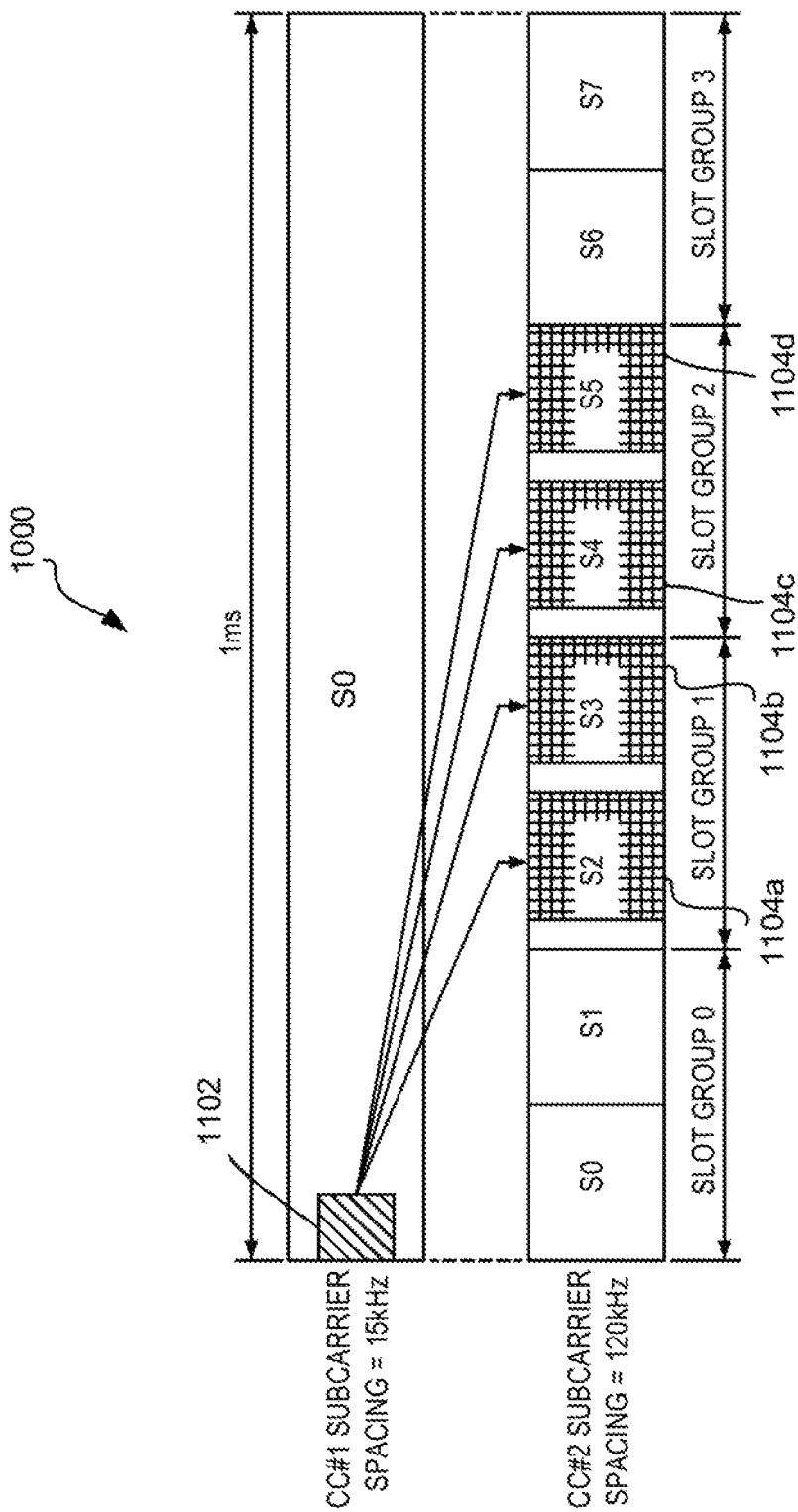
FIG. 11 is a NR signaling diagram illustrating an embodiment of cross-carrier multiple slot scheduling using slot group indices.
Figure 12:
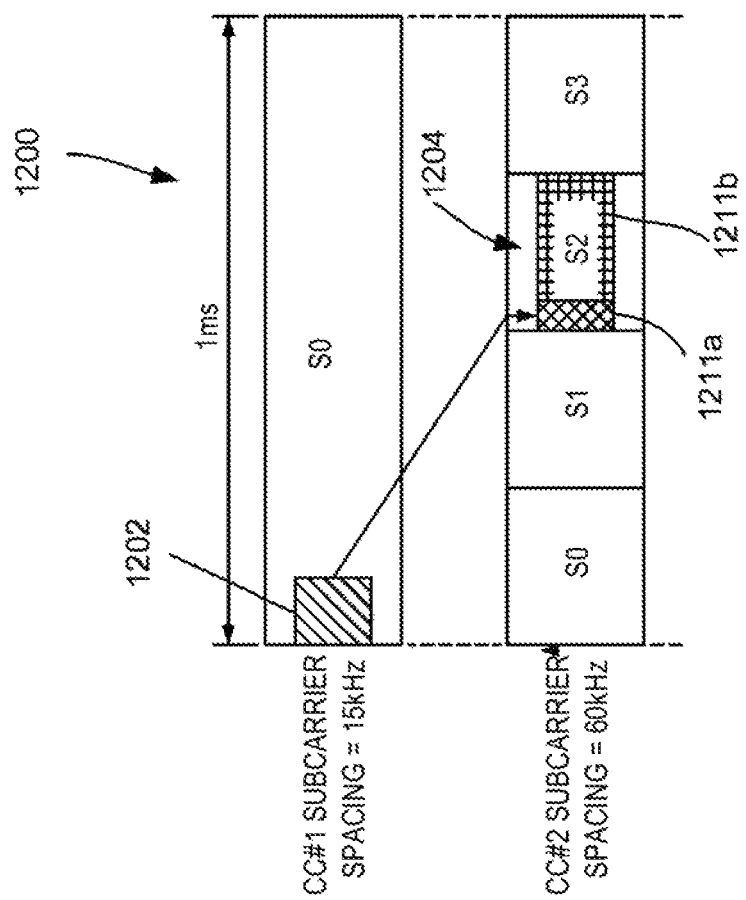
FIG. 12 is a NR signaling diagram illustrating an embodiment of cross-carrier scheduling with two stage DCI.

Reference will now be made to FIGS. 8-12, which illustrate various embodiments of cross-carrier scheduling using a one-step timing indication (FIG. 8), a two-step timing indication (FIG. 9), using multi-slot scheduling (FIGS. 10-11), and a two-stage DCI (FIG. 12). FIGS. 8-12 will now be described in further detail below.

Figure 8:
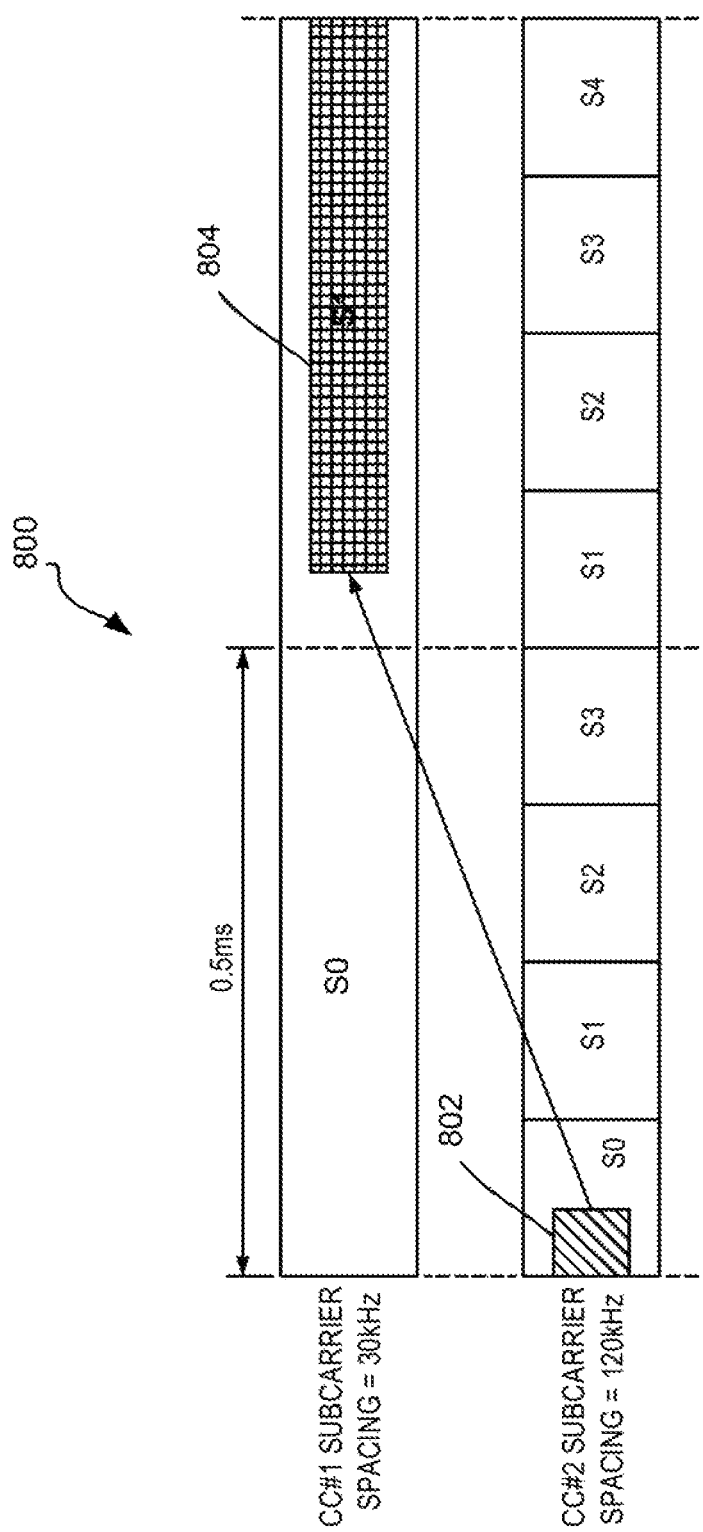
FIG. 8 is a NR signaling diagram illustrating an embodiment of cross-carrier and cross-slot scheduling with a one element delay indication.

Reference is now made to FIG. 8, which shows, in the form of a NR signaling diagram 800, one example of an embodiment of cross-carrier and cross-slot scheduling with one element (which may be referred to as a "step" in the figure) delay indication. In the shown example, 30 kHz and 120 kHz subcarrier spacings are used in CC #1 and CC #2, respectively. It is shown that PDCCH control transmission 802 at CC #2 may be used to schedule the PDSCH or PUSCH data transmission 804 at CC #1. CC #1 includes a total of 2 slots S0 and S1 as shown, and CC #2 includes a total of 8 slots numbered as S0 through S3 within the first slot boundary of CC #1, and back to S0 through S3 within the second slot boundary of CC #1 as shown. In the shown example of FIG. 8, the scheduling/timing delay in slot (one slot delay) between the end slot of PDCCH control transmission 802 and the beginning slot of PDSCH or PUSCH data transmission 804 may be derived based on the smallest subcarrier spacing, which is 30 kHz in CC #1 (that is, the delay would be indicated as a one slot delay, based on the slot duration of the CC with the smallest subcarrier spacing, that is, CC #1.

In some demonstrative embodiments, a two-step timing indication mechanism may be employed for the scheduling of data transmission in another CC. For example, in the first step of the scheduling indication, the first timing indication may be defined in accordance with the slot using subcarrier spacing in the CC where the PDCCH is transmitted, while in the second step of the scheduling indication, the second timing indication may be defined in accordance with the slot using subcarrier spacing in the CC where PDSCH or PUSCH data is transmitted.

Figure 9:
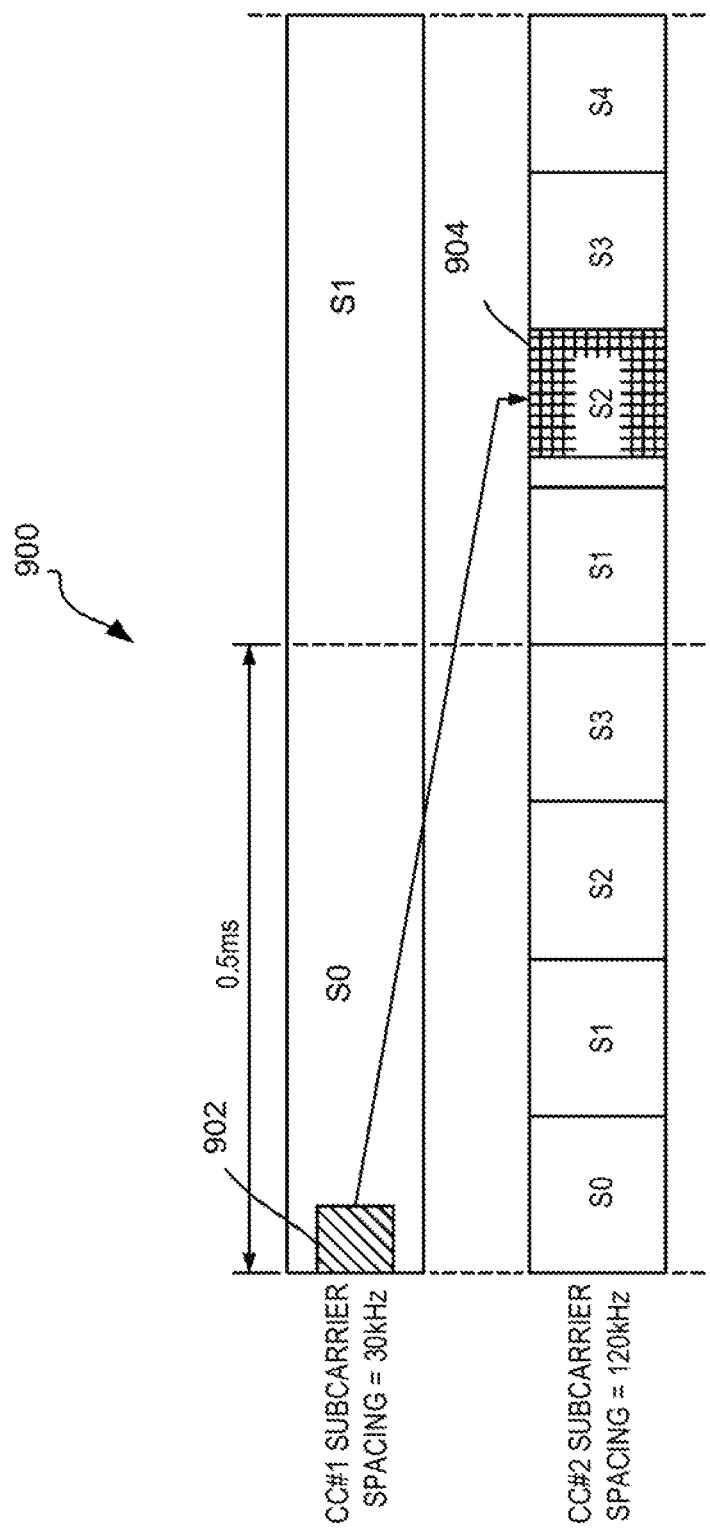
FIG. 9 is a NR signaling diagram illustrating an embodiment of cross-carrier and cross-slot scheduling using a two element timing indication.

Reference is now made to FIG. 9, which illustrates one example, in the form of NR signaling diagram 900, of embodiments of cross-slot and cross-carrier scheduling using a two-step timing indication. In the shown example, 30 kHz and 120 kHz subcarrier spacings are used in CC #1 and CC #2, respectively. It is shown that PDCCH control transmission 902 at CC #1 may be used to schedule the PDSCH or PUSCH data transmission 904 at CC #2. CC #1 includes a total of 2 slots S0 and S1 as shown, and CC #2 includes a total of 8 slots numbered as S0 through S3 within the first slot boundary of CC #1, and back to S0 through S3 within the second slot boundary of CC #1 as shown. In the first step of the scheduling indication, a first timing indication may be defined in accordance with the slot using subcarrier spacing in the CC where the PDCCH is transmitted, while in the second step of the scheduling indication, the second timing indication may be defined in accordance with the slot using subcarrier spacing in the CC where the data transmission PDSCH or PUSCH is effected.

In the example of FIG. 9, the first step of the scheduling indication would provide information, for example in the DCI, using a slot delay of one slot based on the subcarrier spacing of 30 kHz in CC #1 where the PDSCH data is transmitted (in this case the smallest subcarrier spacing as between the two CC's), and therefore point to S1 of CC #1. The second step of the scheduling indication would provide timing delay information, for example also in the DCI, in the form of a slot index within the timing/slot boundary of S1 of CC #1 up to PDSCH or PUSCH data transmission 904. The latter slot index would correspond to S1 in CC #2, measured as S1 starting from the timing/slot boundary of S1 of CC #1 which was determined in the first step.

In some demonstrative embodiments, whether a one-step timing indication or two element timing/scheduling indication is used may according to some embodiments be configured by high layer signaling or predefined in the specification. Whether a one-step or two-step timing/scheduling indication is used may according to some embodiments depend on whether the CC for PDCCH transmission has a larger or a smaller subcarrier spacing or short TTI duration (e.g., mini-slot) than the CC for PDSCH or PUSCH transmission. For example, in a case when CC for PDCCH transmission may have a smaller subcarrier spacing than CC for PDSCH or PUSCH transmission, a two-step or two-element timing indication may be applied. One reason for the latter is that smaller subcarrier spacing for the CC where the PDSCH or PUSCH data is transmitted signifies larger slot sizes on that CC than the slot sizes of the CC where the data transmission occurs, making it easier to denote the first step according to the smaller subcarrier spacing/larger slot size of the PDCCH CC. Conversely, where the CC for PDCCH transmission may have a larger subcarrier spacing than the CC for PDSCH/PUSCH transmission, a one-step or one-element timing indication may be applied.

In some demonstrative embodiments, cross-carrier scheduling may be used to perform scheduling of data transmissions in multiple slots. For example, where there are to be multiple PDSCH or PUSCH data transmissions in multiple respective slots in a CC, for example, in a CC #2, to reduce signaling overhead in the DCI in a CC #1, a bitmap may be imposed onto the slot index to indicate which slot(s) may be used for the data transmission, where the bit value "1" in the bitmap may indicate that a slot is to be used while the bit value "0" may indicate that a slot is not to be used for the data transmission. In some demonstrative embodiments, cross-carrier multi-slot scheduling may be configured by high layer signaling via a NR minimum system information (MSI), NR remaining minimum system information (RMSI), NR other system information (OSI) or via RRC signaling.

In some demonstrative embodiments regarding the case of multi-slot scheduling, some of the information in the DCI may be common across multiple PDSCH or PUSCH data transmissions in order to help achieve the desired reduction in signaling overhead. For instance, resource allocation may be common across PDSCHs/PUSCHs data transmissions in different slots. Further, DCI may indicate the starting HARQ process identification (ID) for the data transmission in the first slot, and the HARQ process ID for data transmission for subsequent slots may be derived accordingly. For instance, the HARQ process ID may be incrementally increased by 1 in the HARQ process ID. In one example, HARQ process ID may be 3 for data transmission in the first slot, and subsequently 4 in the second slot, and so forth.

In some demonstrative embodiments with respect to the case of consecutive multi-slot scheduling where data transmission is scheduled in consecutive slots, demodulation reference symbols (DM-RS) may not be present in each slot, and in some slots, DM-RS may not be present. The latter may further help to improve the spectrum efficiency for data transmission in the event of consecutive multi-slot data transmission scheduling. Whether DM-RS is present in one or more slots may be configured by high layer signaling or dynamically indicated in the DCI or a combination thereof.

FIG. 10 illustrates one example, in the form of NR signaling diagram 1000, of an embodiment for cross-carrier multiple-slot scheduling. In the shown example, 30 kHz and 120 kHz subcarrier spacings are used in CC #1 and CC #2, respectively. It is shown that PDCCH control transmission 1002 at CC #1 may be used to schedule the PDSCH or PUSCH data transmissions 1004a and 1004b at CC #2. CC #1 includes a total of 2 slots S0 and S1 as shown, and CC #2 includes a total of 8 slots numbered as S0 through S3 within the first slot boundary of CC #1, and back to S0 through S3 within the second slot boundary of CC #1 as shown. In the example, PDCCH control transmission 1002 in S0 of CC #1 is used to schedule the data transmission in S1 and S2 in CC #2 within the slot boundary of CC #1 (within the time boundary of the next slot, S1, of CC #1). A bitmap with "0110" in the DCI may be used for the scheduling of data transmission in CC #2 to indicate that, within the S1 boundary of CC #1 in CC #2, S0 and S3 do not have any data in them, but that S1 and S2 do.

In some demonstrative embodiments, in cases when the number of slots in one CC within slot boundary in another CC is relatively large (e.g. 8 or more) a slot group index may be used to designate a cluster of consecutive slots when providing scheduling information regarding cross CC data transmission. The use of slot group indices may help reduce signaling overhead in the DCI by effectively reducing the need to designate each slot where data is to be transmitted individually. More specifically, the number of slots within one slot group may be predefined in the specification or configured by high layer signaling via NR MSI, NR RMSI, NR OSI or RRC signaling.

Referring now to FIG. 11, an illustration is provided of one example, in the form of NR signaling diagram 1100, of embodiments of cross-carrier multiple slot scheduling using slot group index. In the shown example, 15 kHz and 120 kHz subcarrier spacings are used in CC #1 and CC #2, respectively. It is shown that PDCCH control transmission 1102 at CC #1 may be used to schedule the PDSCH or PUSCH data transmissions 1104a, 1104b, 1104c and 1104d at CC #2. CC #1 includes a total of 1 slot as shown, and CC #2 includes a total of 8 slots numbered as S0 through S7 within the slot boundary of CC #1. In addition, S0 and S1 are shown as being in Slot group #0, S2 and S3 are shown as being in Slot group #1, S4 and S5 are shown as being in Slot group #2, and S6 and S7 are shown as being in Slot group #3. In the example, the bitmap to designate the scheduling refers to the slot groups within the slot boundary of CC #1, and, therefore, a bitmap with "0110" in the DCI may be used to schedule the data transmission in Slot groups #1 and #2 with Slot groups #0 and #3 not including the data transmission. Two or more slots may be grouped in one slot group according to some embodiments. In the shown example of FIG. 11, the data may be transmitted in S2 to S5 on CC #2.

In other embodiments, the starting symbol of data transmission may be configured by high layer signaling via NR MSI or NR RMSI, or NR OSU or RRC signaling or dynamically indicated in the DCI or a combination thereof. In some demonstrative embodiments of cross-carrier multiple subframe scheduling, the starting symbol of data transmission may be common across multiple slots. In addition, dynamic resource sharing of DL control and DL data transmission may be enabled to improve spectrum efficiency. More specifically, when a starting symbol of a DL data transmission is equal to or less than the control resource set duration, the DL data channel may be rate matched around the control resource set, or may be puncturing the control resource set or the resources actually used for transmission of the DL control channel.

In other embodiments, in cases when PDCCH at low band is used to schedule the data transmission at high band, a beam pair link index may be indicated in the DCI. More particularly, for the scheduling of DL data transmission at high band, the use of a beam pair link index may be realized by the indication of a spatial Quasi co-located (QCL) assumption between DL reference signal (RS) antenna port(s) and Demodulation RS (DM-RS) antenna port(s) of the DL data channel. Similarly, for the UL data transmission at high band by a UE, the indication in the DCI of a Sounding Reference Signal (SRS) resource (SRI) which has been transmitted by the UE in a previous time instance may be used to also indicate the transmit (Tx) beam for the UL data transmission. In some demonstrative embodiments of cases where a Phase Tracking Reference Signal (PT-RS) is used at high band, some information regarding the scheduling of PT-RS in the time and frequency domains and code domain may be indicated in the DCI.

In some demonstrative embodiments, a two stage DCI may be applied, where the first stage DCI may be transmitted in the first CC while the second stage DCI and the scheduled DL data may be transmitted in the second CC. The fact of the second stage DCI in the second CC may be indicated in the first stage DCI. By way of example, in the first stage DCI, the following information may be included: (1) a resource allocation of the second stage DCI or data transmission; (2) an indication of payload size, aggregation level, and/or candidates for the second stage DCI; (3) a DL control resource set used for the monitoring of the second stage DCI; and/or (4) a beam pair link index for the transmission of the second stage DCI or data channel at high band.

FIG. 12 illustrates one example, in the form of a NR signaling diagram 1200, of embodiments of cross-carriers scheduling with two stage DCI. In the shown example, 15 kHz and 60 kHz subcarrier spacings are used in CC #1 and CC #2, respectively. Therefore, slot duration for CC #1 is 1 millisecond (ms) and for CC #2 shown as 4 slots is roughly 0.25 ms. Further, it is shown that PDCCH control transmission 1202 at CC #1 including a first stage DCI 1211a, along with a second stage DCI 1211b at CC #2 may be used to schedule the PDSCH or PUSCH data transmission 1204 at CC #2 in S2 of CC #2. In the case of CC #1, the slot duration corresponds to a subframe duration, whereas in CC #2, there are 4 slots, S0, S1, S2 and S3. In the example of FIG. 12, first stage DCI 1211a may be transmitted in CC #1 while the second stage DCI 1211b together with the PDSCH/PUSCH data transmission may be transmitted in CC #2 as transmission 1204. The use of multi-stage DCI may be advantageous for example where the amount of information to be included in the DCI of the PDCCH may be too large for the DCI to carry, such as in a case where there may be two or more users to which data may need to be addressed. In such a case, transmitting the information in two stages reduces the signaling overhead on the control channel and still allows the necessary control information to be transmitted.

HARQ-ACK Feedback on PCell with Different Numerologies or TTI Durations from SCell As previously noted, for carrier aggregation in LTE Rel-10, multiple CCs may be configured and aggregated to support wider transmission bandwidth and higher peak data rate. Further, a UE may have one PCell and multiple SCells, where the PUCCH is only transmitted in PCell. This indicates that HARQ-ACK feedback for the DL data transmission on multiple CCs may be aggregated and carried by PUCCH on PCell.

In LTE Release 13 (Rel-13) enhanced carrier aggregation (eCA), the number of CCs is extended to 32 for both DL and UL. Moreover, a UE may be configured to transmit the UCI on a PUCCH SCell in addition to being configured to transmit the UCI on the PCell. The motivation for the latter was reducing the control signaling overhead of the PCell. More specifically, in Rel-13, CCs are grouped into a primary and secondary PUCCH groups, where PUCCH on the PCell is used to carry UCI of PCell and SCells within the primary PUCCH group and PUCCH on PUCCH SCell is used to carry UCI of SCells within the secondary PUCCH group.

Some embodiments of HARQ-ACK feedback, and specifically of indicating a timing difference between the DL data transmission on SCell in one CC, and the transmission on another CC of the HARQ-ACK feedback on PCell or PUCCH SCell with different numerologies or TTI durations from the SCell for the DL data transmission (hereinafter "different numerologies or TTI durations from the SCell) are provided as set forth below.

In some demonstrative embodiments, a timing difference between the DL data transmission on SCell in one CC and the transmission on another CC of the HARQ-ACK feedback on PCell or PUCCH SCell with different numerologies or TTI durations from SCell may be determined by a combination of higher layer signaling and dynamic indication in the DCI of the PDCCH preceding the DL data transmission on SCell. In particular, a set of values may be configured by higher layer signaling, and the DCI may indicate one value from configured values for HARQ-ACK feedback timing. In this manner, the transmitter of the data would know when to look for the HARQ-ACK corresponding to its data, as it would have indicated this timing in its DCI.

In some demonstrative embodiments, timing indication for HARQ-ACK feedback on PCell or PUCCH SCell with different numerologies or TTI durations from SCell may be defined as follows: (1) in accordance with the smallest subcarrier spacing in two CCs for PDSCH or PUCCH carrying the HARQ-ACK; (2) in accordance with always a reference (e.g. 15 kHz) subcarrier spacing; or (3) in accordance with the subcarrier spacing in the CC where either the PDSCH or the PUCCH is transmitted.

Figure 13:
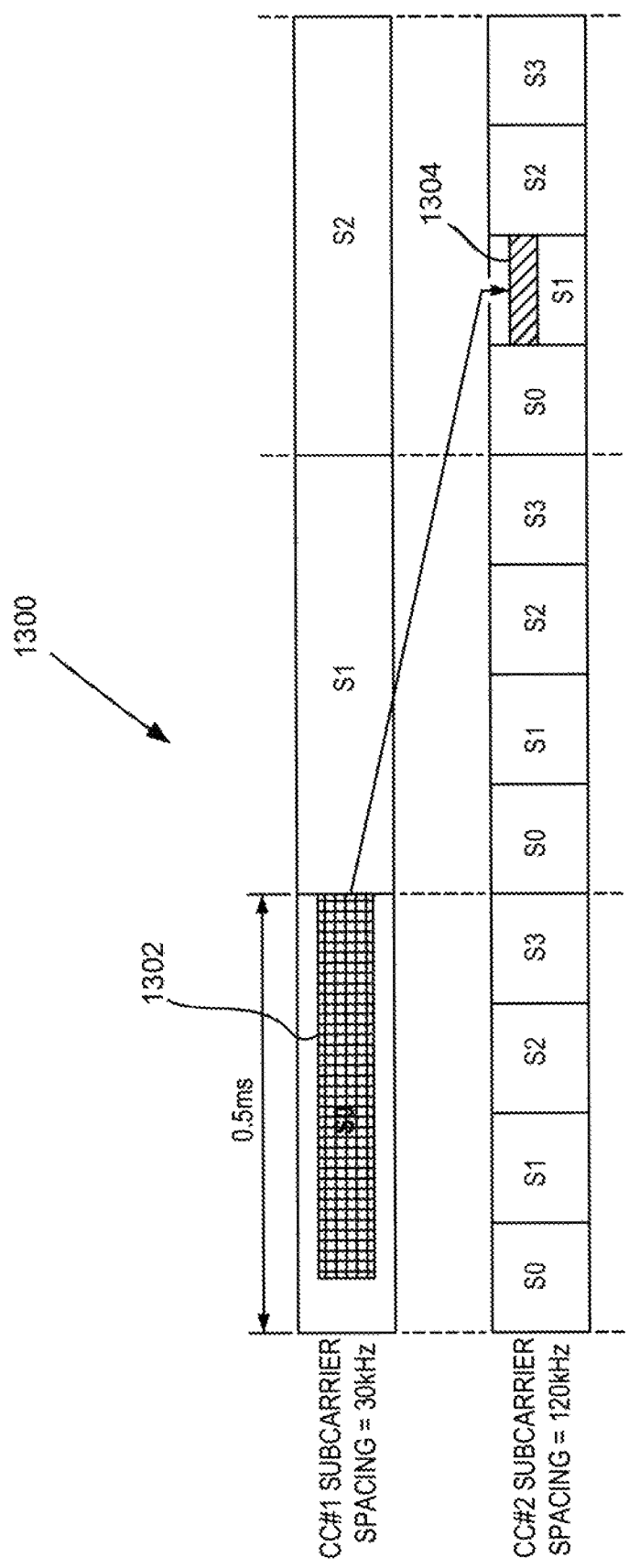
FIG. 13 is a NR signaling diagram illustrating an embodiment of HARQ-ACK feedback on PCell or PUCCH SCell with mixed numerologies using a two-element timing indication process.

In some demonstrative embodiments of HARQ-ACK feedback on PCell or PUCCH SCell with different numerologies from SCell, similar to cross-carrier scheduling as between a PDCCH and a PDSCH or PUSCH as described above in relation to FIG. 9, a two-element or two-step timing indication may be defined, as shown in FIG. 13 described below, where in the first step, timing in slot may be defined in accordance with the numerology used for transmission of PDSCH, while in the second element or step, timing in slot may be defined in accordance with the numerology used for the transmission of PUCCH carrying HARQ-ACK feedback. In addition, a one-element or one-step timing indication may further be defined in this context, similar to the example of FIG. 8 above, as will be described in more detail in relation to FIG. 14 below.

FIG. 13 illustrates one example, in the form of NR signaling diagram 1300, of embodiments of HARQ-ACK feedback on PCell or PUCCH SCell with mixed numerologies using a two-step timing indication process. In the shown example, 30 kHz and 120 kHz subcarrier spacings are used in CC #1 and CC #2, respectively. It is shown that the DCI in a PDCCH control transmission 1302 at CC #1 (not shown, and transmitted ahead of the PDSCH data transmission 1302) may be used to indicate the timing for the HARQ-ACK 1304 at CC #2. CC #1 includes a total of 3 slots S0, S1 and S2 as shown, and CC #2 includes a total of 12 slots numbered as S0 through S3 within the first slot boundary of CC #1, and back to S0 through S3 within each of the subsequent slot boundaries of CC #1 as shown. In the first step of the scheduling indication in DCI, a first timing indication may be defined in accordance with the slot using subcarrier spacing in the CC where the PDSCH is transmitted, while in the second step of the scheduling indication, the second timing indication may be defined in accordance with the slot using subcarrier spacing in the CC where the HARQ-ACK is transmitted. In this example of FIG. 13, one slot delay in the DCI may be based on subcarrier spacing for the transmission of PDSCH in CC #1. Further, slot index S1 in the DCI may indicate which slot is used for the transmission of PUCCH carrying HARQ-ACK feedback.

Although in the figures, the PUCCH carrying the HARQ-ACK may span one slot, the design may be extended to the case when short PUCCH may be used to carry HARQ-ACK feedback using one or a few symbols within the slot. For example, in such a case, a mini-slot indication mechanism similar to the mini-slot scheduling mechanism of FIG. 7 may be used. For example, a PDSCH numerology at CC #1 may be used to indicate a timing of a HARQ-ACK carried in a PUCCH at CC #2 by indicating the symbols carrying the PUCCH at CC #2 in terms of corresponding symbol #'s in CC #1 (that is, in accordance with the subcarrier spacing of CC #1).

In some demonstrative embodiments, the delay for HARQ-ACK timing may be derived as shown with respect to Equation 2 set forth previously.

Figure 14:
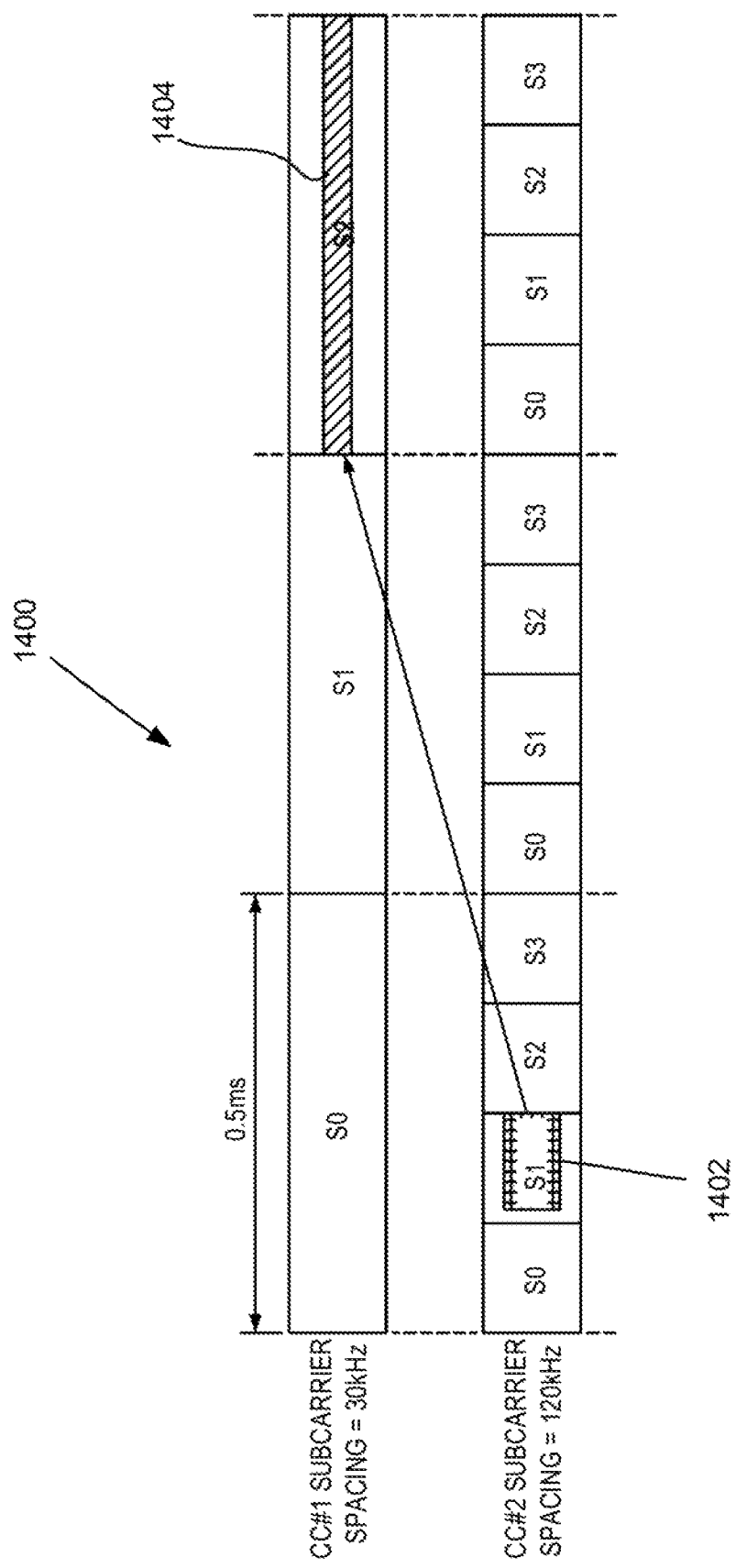
FIG. 14 is a NR signaling diagram illustrating another embodiment of HARQ-ACK feedback on PCell or PUCCH SCell with mixed numerologies or TTI durations from SCell.

FIG. 14 illustrates one example, in the form of NR signaling diagram 1400, of embodiments of HARQ-ACK feedback on PCell or PUCCH SCell with different numerologies or TTI durations from SCell. In the shown example, 30 kHz and 120 kHz subcarrier spacings are used in CC #1 and CC #2, respectively. It is shown that the numerology associated with PDSCH data transmission 1402 at CC #2 may be used to indicate the PUCCH 1404 at CC #1. CC #1 includes a total of 3 slots S0, S1 and S3 as shown, and CC #2 includes a total of 12 slots numbered as S0 through S3 within the first slot boundary of CC #1, and back to S0 through S3 within each of the subsequent slot boundaries of CC #1 as shown. In the shown example of FIG. 14, the scheduling/timing delay in slot (one slot delay) between the end slot of PDSCH data transmission 1402 and the beginning slot of PUCCH control transmission 1404 may be derived based on the smallest subcarrier spacing, which is 30 kHz in CC #1 (that is, the delay would be indicated as a one slot delay, based on the slot duration of the CC with the smallest subcarrier spacing, that is, CC #1). In particular, using Equation 1, in the example of FIG. 14, $\Delta_f^{CC1}$=30 kHz and $\Delta_f^{CC2}$=120 kHz and $N_{delay}$=6 which may be indicated in the DCI. Then $I_{delay}$=1 slot.

In some demonstrative embodiments, whether one-step or two-step timing indication is used may be configured by high layer signaling or predefined in the specification, or may depend on whether SCell for PDSCH transmission has larger subcarrier spacing or short TTI duration (e.g., mini-slot) than PCell or PUCCH SCell for PUCCH transmission. For instance, in the case when SCell for PDSCH transmission may have a smaller subcarrier spacing than PCell or PUCCH SCell for PUCCH transmission (the case of FIG. 13 above for example), two element timing indication may be applied. In other embodiments, PUCCH on PCell or PUCCH SCell carrying HARQ-ACK feedback may be transmitted within the same duration as that for SCell for the transmission of PDSCH.

In some demonstrative embodiments, a single timing indication in the DCI may be used to indicate the HARQ-ACK feedback timing from a set of values which may be configured by higher layer signaling. In this regard, reference is now made to FIGS. 15a and 15b, which show other embodiments of HARQ-ACK feedback on PCell or PUCCH SCell with different numerologies or TTI durations from SCell in the context of NR signaling diagrams 1500a and 1500b, respectively. This signaling diagrams show numerologies identical with those of the ones described already in relation to FIG. 14.

Figure 15A:
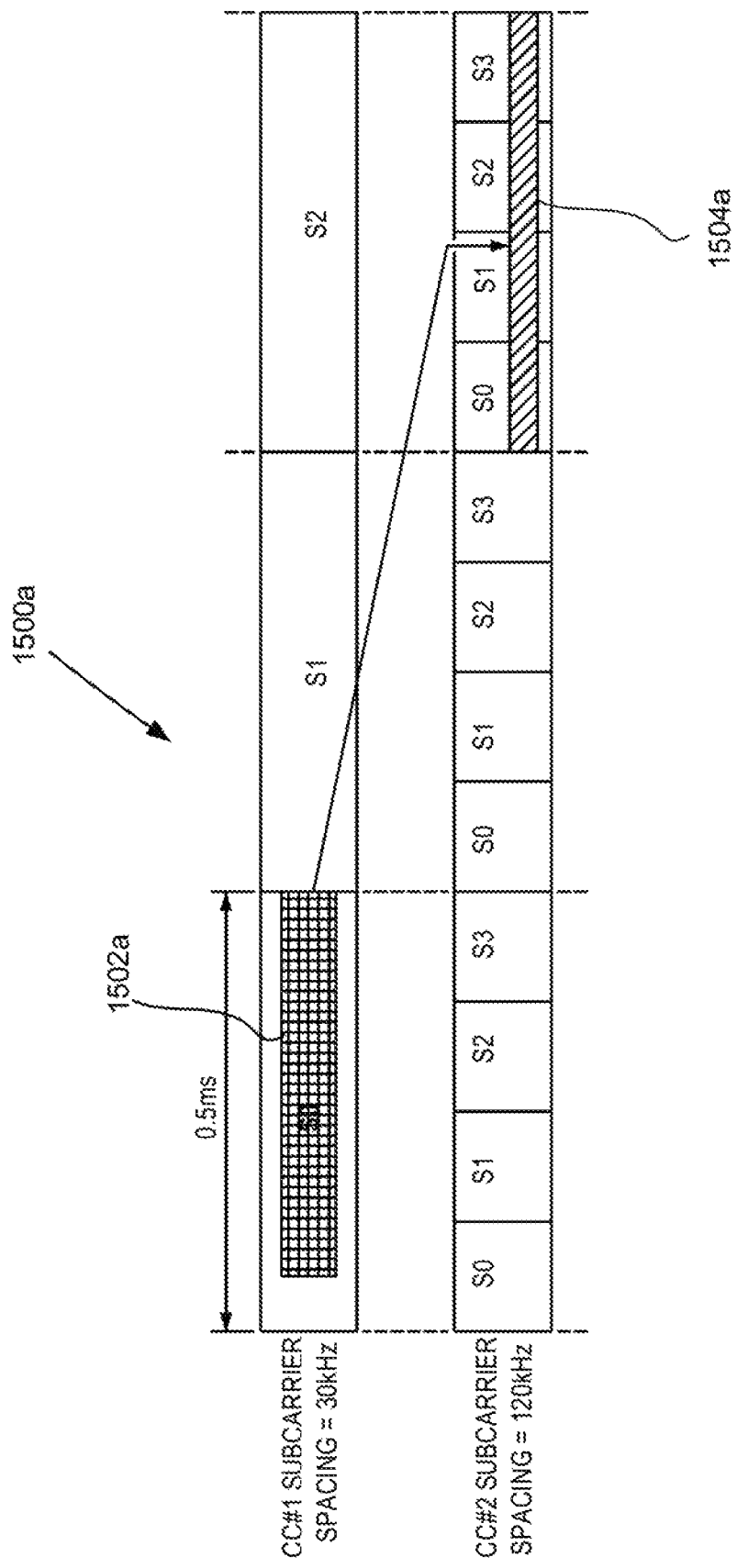
FIG. 15a is a NR signaling diagram illustrating an embodiment where multiple slots are used for the transmission of PUCCH carrying a HARQ-ACK for PDSCH data transmission.
Figure 15B:
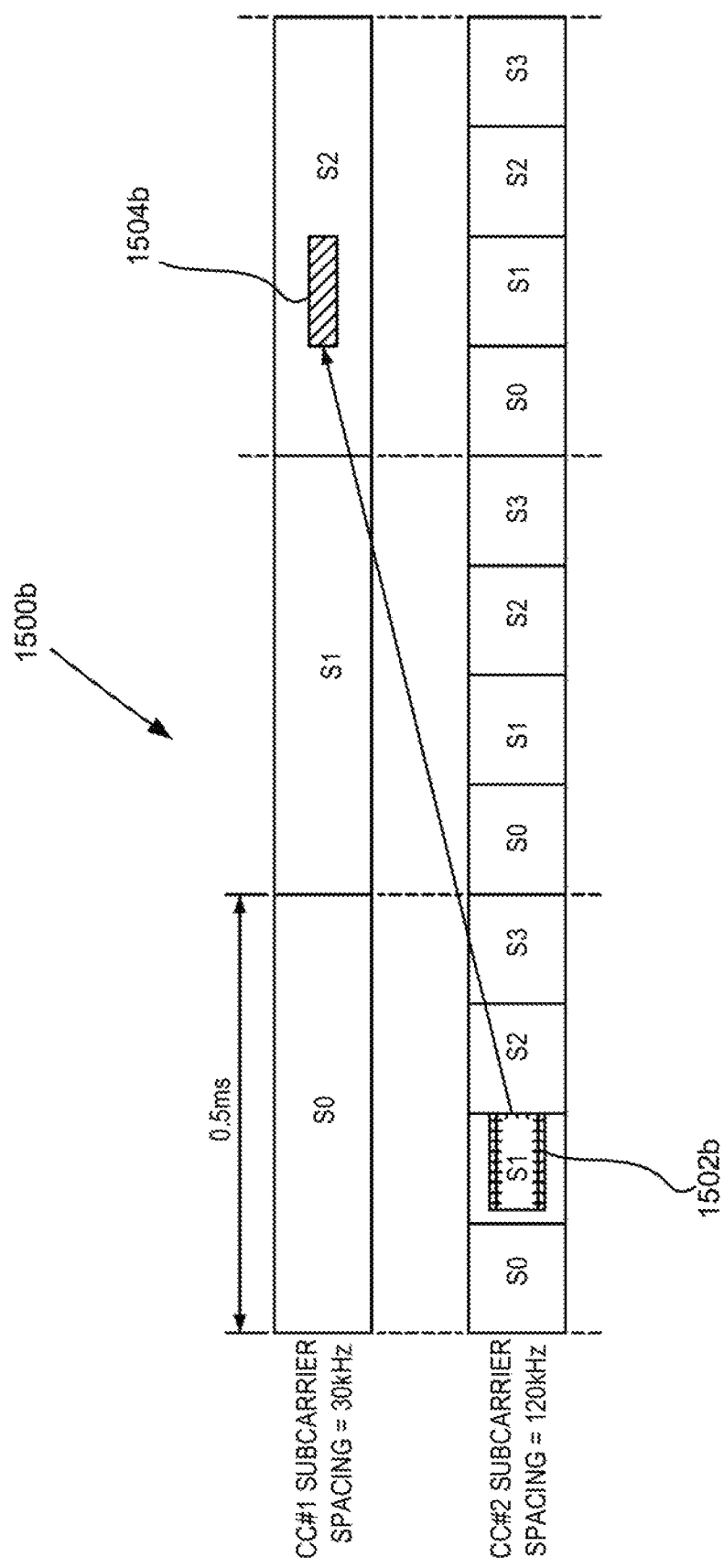
FIG. 15b is a NR signaling diagram illustrating an embodiment where a mini-slot structure is shown for the transmission of the PUCCH carrying the HARQ-ACK.

In FIG. 15a, multiple slots are shown as being used for the transmission of PUCCH 1504a carrying the HARQ-ACK for PDSCH data transmission 1502a, and in FIG. 15b, a mini-slot structure is shown for the transmission of the PUCCH 1504b carrying the HARQ-ACK so as to align the slot duration in SCell where PDSCH data is transmitted. In the embodiment of FIG. 15b, a ACK/NAK Resource Indicator (ARI) in the DCI of the PDCCH control transmission 1502b preceding the PSDCH, in addition to RRC signaling, may indicate which one of a set of resources may be used for the HARQ-ACK feedback by the UE. For both embodiments in FIGS. 15a and 15b, only one delay indicator with regard to slot using smallest subcarrier spacing among CCs may be indicated in the DCI for scheduling of PDSCH transmission.

In some demonstrative embodiments, when a UE is configured with multiple CCs for HARQ-ACK feedback, dynamic CC switching for the transmission of PUCCH carrying HARQ-ACK feedback may be employed for cross-carrier HARQ operation. In particular, one field in the DCI or Medium Access Control Control Element (MAC-CE) may be used to indicate which CC may be used for the transmission of PUCCH carrying HARQ feedback.

HARQ-ACK Codebook Design for NR Carrier Aggregation:

For carrier aggregation (CA) in LTE Rel-10, up to 5 component carriers (CC) can be aggregated to support wider transmission bandwidth of 100 MHz and higher peak data rate. Further, a UE can be configured with one primary cell (PCell) and multiple secondary cells (SCell), where physical uplink control channel (PUCCH) is only transmitted in PCell. This indicates that HARQ-ACK feedback in case of simultaneous DL transmissions on multiple CCs needs to be aggregated and conveyed on single uplink CC.

In Rel-13 enhanced carrier aggregation (eCA), the number of CCs was extended to 32 for both DL and UL. Moreover, a UE compliant with Rel-13 may be configured to transmit the UCI on a PUCCH SCell in addition to the PCell with the motivation of reducing the control signaling overhead of the PCell. More specifically, CCs in Rel-13 may be grouped into a primary and secondary PUCCH group, where PUCCH on the PCell is used to carry UCI of PCell and SCells within the primary PUCCH group and PUCCH on PUCCH SCell is used to carry UCI of SCells of the secondary PUCCH group.

For NR, it is envisioned that more spectrum including unlicensed and carrier frequency above 6 GHz will become available. Taking into account the support of a massive number of CCs, it is more desirable to consider LTE Rel-13 eCA framework as a starting point for NR CA, in particular given that PUCCH carrying UCI can be transmitted on both PCell and PUCCH SCell.

Given that different numerologies may be applied for the DL data transmission on different CCs, e.g., in case when low band (i.e., carrier frequency below 6 GHz) and high band (i.e., carrier frequency above 6 GHz) are formed for carrier aggregation, certain enhancements on HARQ-ACK codebook design for carrier aggregation with same or mixed numerologies and different transmission time interval (TTI) durations need to be considered.

Some embodiments herein relate to a HARQ-ACK codebook design for NR carrier aggregation. In particular, embodiments may include one or more of the following aspects: (1) semi-static HARQ-ACK codebook for carrier aggregation with same or mixed numerologies or TTI duration; and (2) dynamic HARQ-ACK codebook for carrier aggregation with same or mixed numerologies or TTI duration. Embodiments may be applied in cases when different CCs have different slot durations. For instance, HARQ-ACK feedback for the corresponding PDSCH data transmission at high band may be transmitted on PUCCH at low band, where different numerologies or slot durations are used for CCs at low and high band respectively. Further, different TTI durations may refer to a case when slot or mini-slot is applied for the transmission.

For HARQ-ACK codebook design for NR carrier aggregation, one key issue is to ensure that the gNB and the UE would have same understanding of the total number of and the order of HARQ-ACK feedback bits. More specifically, a semi-static or a dynamic HARQ-ACK codebook for carrier aggregation may be supported for NR, and embodiments for each will be described below. Whether to employ semi-static or dynamic HARQ-ACK codebook can be configured by higher layers via a NR MSI, a NR RMSI, a NR OSI and/or a RRC signaling.

According to some demonstrative embodiments, if a UE does not support simultaneous transmission of different numerologies, it may assume that the same numerology or TTI duration is applied for the transmission of PUCCH on PCell and PUCCH SCell. Further, if a gNB schedules different numerologies or TTI durations for two PUCCH transmissions, certain dropping rule or priority rule may need to be defined. For instance, a UE may drop the PUCCH with the larger subcarrier spacing.

Semi-Static HARQ-ACK Codebook for Carrier Aggregation with Same or Mixed Numerologies or TTI Duration According to a first embodiment, for a semi-static HARQ-ACK codebook, a total number of HARQ-ACK bits may be derived based on the number of configured CCs and/or the size of the corresponding HARQ-ACK aggregation window. The latter may be applied for Frequency Division Duplex (FDD) or dynamic Time Division Duplex (TDD) system, where the HARQ-ACK feedback for multiple DL transmissions may be aggregated and carried by one PUCCH. In the event that the UE miss-detects PDCCH for scheduling of data transmission, or fails to decode the PDSCH data transmission, the UE may feedback a Negative Acknowledgment (NACK) in the corresponding CC and slot.

The number of CCs for carrier aggregation may, according to one embodiment, be configured via dedicated RRC signaling. In addition, the HARQ-ACK aggregation window size may be predefined in the NR specification, or it may be configured via NR MSI, NR RMSI, NR OSI or RRC signaling, or it may be dynamically indicated in the downlink control information (DCI) within the PDCCH control transmission ahead of the PDSCH data transmission, or a combination thereof. In the latter case, a set of values may be configured by higher layers, and one field in the DCI may be used to indicate which one value from configured values is used to indicate the HARQ-ACK aggregation window size.

Figure 16:
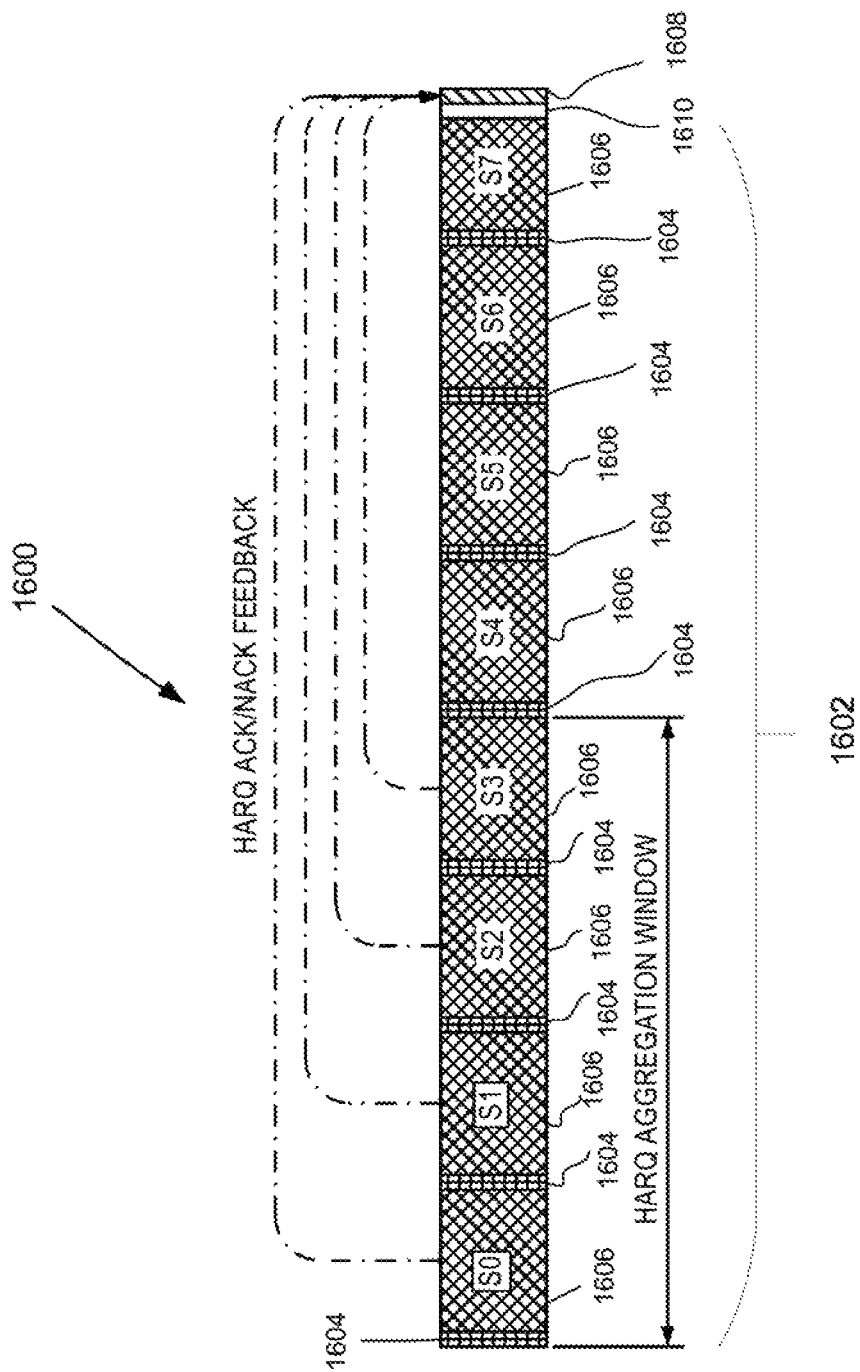
FIG. 16 is a NR signaling diagram illustrating an embodiment of a HARQ-ACK aggregation window for one CC where the HARQ-ACK feedback is aggregated.

FIG. 16 illustrates one example, in the form of NR signaling diagram 1600, of embodiments of HARQ-ACK feedback for carrier aggregation with same or mixed numerologies or TTI duration. In the shown example, the downlink transmission 1602 includes a series of PDCCH control transmissions 1604 and a series of corresponding PDSCH data transmissions 1606, and the uplink transmission 1608 represents the PUCCH control transmission, which is separated from the downlink transmission by a Guard Period GP 1610. The slots are denominated S1-S8. FIG. 16 illustrates one example embodiment of a HARQ-ACK aggregation window for one CC. In the shown example, the HARQ-ACK aggregation window size is 4 slots as shown, where the HARQ-ACK feedback for 4 DL transmissions S0 through S7 may be aggregated and carried by PUCCH control transmission 1608.

Certain embodiments of semi-static HARQ-ACK codebook for carrier aggregation with same or mixed numerologies described below.

Figures 17A, 17B:
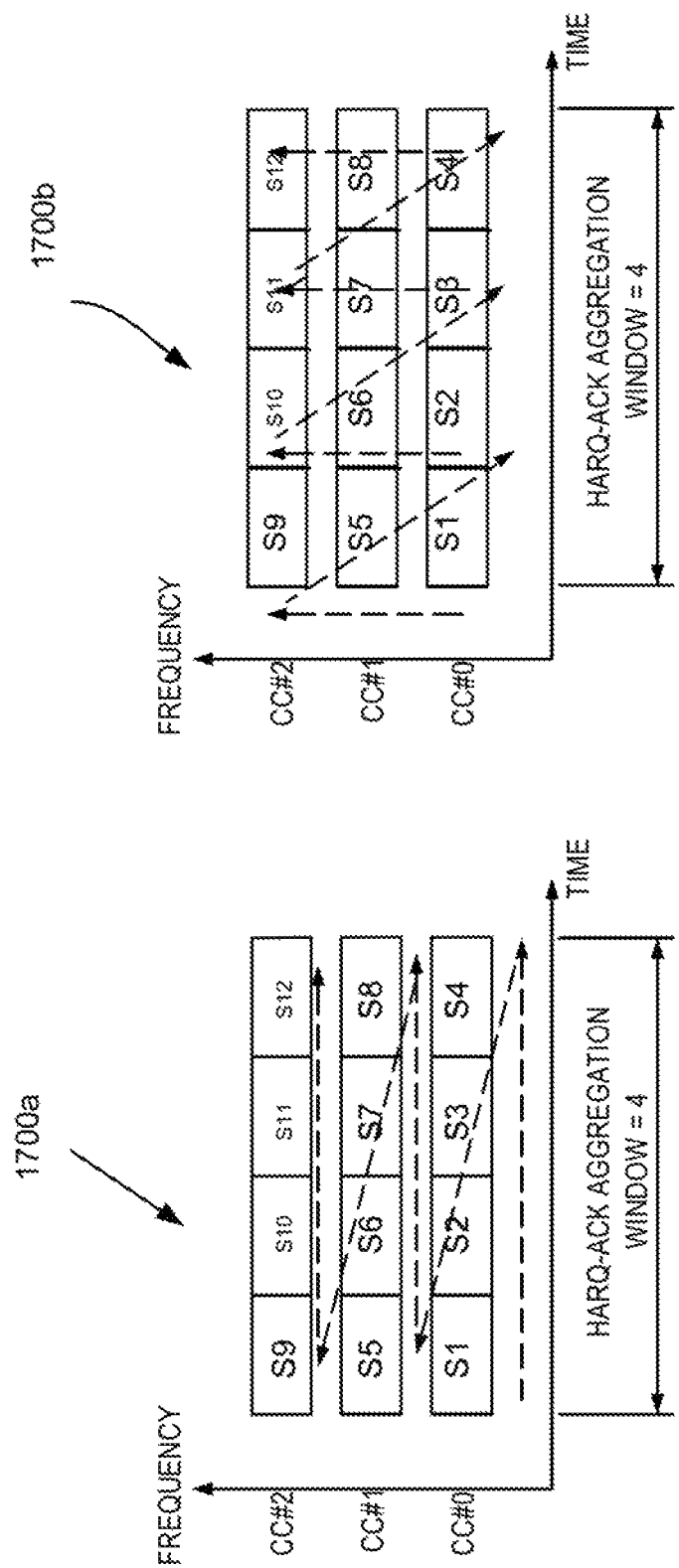
FIG. 17a is a NR signaling diagram illustrating an embodiment for cross-carrier multiple-slot scheduling involving a HARQ-ACK feedback with its bits ordered in the UCI in a time first frequency second manner.
FIG. 17b is a NR signaling diagram illustrating an embodiment for cross-carrier multiple-slot scheduling involving a HARQ-ACK feedback with its bits ordered in the UCI in a frequency first time second manner.

In some embodiments, when same or different numerologies or TTI durations are employed for multiple CCs, the order of HARQ-ACK bits can be incremented in a time first frequency second manner, or in a frequency first time second manner, for both TDD and FDD. While FIGS. 17a and 17b pertain to respective embodiments for ordering HARQ-ACK bits when the same numerology or TTI duration is employed for multiple CCs, FIGS. 18a and 18b pertain to respective embodiments for ordering HARQ-ACK bits when different numerologies or TTI durations are employed as between multiple CCs. FIGS. 17a and 18a pertain to an ordering of the HARQ-ACK bits in a time first frequency second manner, while FIGS. 17b and 18b pertain to an ordering of the HARQ-ACK bits in a frequency first time second manner.

FIG. 17a illustrates one example, in the form of NR signaling diagram 1700a, of an embodiment for cross-carrier multiple-slot scheduling. In the shown example, the same numerology or TTI duration is used in CC #0, CC #1, and CC #2 respectively. In such a case, the HARQ-ACK feedback may have its bits ordered in the UCI in a time first frequency second manner as shown by the broken arrows 1702a in FIG. 17a. There are shown 4 slots per CC, S1-S12, with the aggregation window for the HARQ-ACK being 4 slots. The bits in the HARQ-ACK will track the data transmissions in the CC's starting at CC #0 starting at S1 and moving through time to S4, and then will track a different frequency at CC #1, start at S5 and track S8, and then will again track at a different frequency at CC #2 to finish off and go through S9 through S12 of CC #2.

FIG. 17b illustrates one example, in the form of NR signaling diagram 1700b, of an embodiment for cross-carrier multiple-slot scheduling. In the shown example, similar to FIG. 17a, the same numerology or TTI duration is used in CC #0, CC #1, and CC #2 respectively. In such a case, the HARQ-ACK feedback may have its bits ordered in the UCI in a frequency first time second manner as shown by the broken arrows in FIG. 17b. There are shown 4 slots per CC, with the aggregation window for the HARQ-ACK being 4 slots. The bits in the HARQ-ACK will therefore track the data transmissions in the CC's starting at S1 of CC #0 and move through S5 of CC #1 and S9 of CC #2, moving through frequencies first, and then track S2 of CC #0, S6 of CC #1 and S10 of CC #2, and back again through time to S3 of CC #0, S7 of CC #1 and S11 of CC #2, and finally back through time to S4 of CC #0 to S8 of CC #1 and finally to S12 of CC #2.

Where different numerologies or TTI durations are employed for multiple CCs, the HARQ-ACK aggregation window may, according to some embodiments, be defined with regard to the slot duration according to smallest subcarrier spacing or largest TTI durations among configured CCs, or according to a 1 ms subframe duration. For a semi-static HARQ-ACK codebook design in the case of different numerologies, the total codebook size may be determined by the number of configured CCs, the HARQ-ACK aggregation window size, and subcarrier spacing or slot duration difference between CCs. Example embodiments for ordering bits in the HARQ-ACK feedback for transmission in CCs with different numerologies or TTI durations are described below in relation to FIGS. 18a and 18b below.

FIGS. 18a and 18b illustrate one example, in the form of respective NR signaling diagrams 1800a and 1800b, of respective embodiments for cross-carrier multiple-slot scheduling with different or mixed numerologies as between multiple CCs. In the shown examples, different numerologies or TTI durations are used as between CC #0 and CC #2 on the one hand, and CC #1 on the other hand, respectively. While CC #0 and CC #2 have subcarrier spacings corresponding to 30 KHz, CC #1 has a subcarrier spacing corresponding to 15 KHz. There are shown four slots S1 through S4 for CC #0, S5 and S6 for CC #1 and S7 through 510 for CC #2, with the aggregation window for the HARQ-ACK being defined with regard to slot duration according to the CC with the smallest subcarrier spacing, which, in the shown embodiment, corresponds to the slot spacing for CC #0 or CC #2 at 15 KHz. Therefore, here, the HARQ-ACK window corresponds to 2 slots in a 15 KHz subcarrier spacing CC.

As seen in the NR signaling diagram 1800a of FIG. 18a, the HARQ-ACK feedback may have its bits ordered in the UCI in a time first frequency second manner as shown by the broken arrows in FIG. 18a. The bits in the HARQ-ACK will track the data transmissions in the CC's starting at S1 of CC #0 through S4 of CC #0, then track S5 through S6 of CC #1, and then track S7 through S10 of CC #2.

As seen in the NR signaling diagram 1800b of FIG. 18b, the HARQ-ACK feedback may have its bits ordered in the UCI in a frequency first time second manner as shown by the broken arrows in FIG. 18b. The bits in the HARQ-ACK will track the data transmissions in the CC's starting at S1 of CC #0, and move to S5 of CC #1, then to S7 of CC #2, then track S2 of CC #0, S8 of CC #2, then track S3 of CC #0, S6 of CC #1, S9 of CC #2, S4 of CC #0, and S10 of CC #2.

In another embodiment, when different numerologies or TTI durations are employed for multiple CCs, a hybrid of the approaches in FIGS. 18a and 18b may be used. According to this embodiment, the order of HARQ-ACK bits may be incremented in a time first manner, and then after it reaches a slot boundary, it may be incremented in a frequency manner. Subsequently, after it reaches all the configured CCs within the slot time, it may be incremented in the time manner again. Note that slot boundary or slot duration may be defined based on the smallest subcarrier spacing or largest TTI durations of the configured CCs, or based on a 1 ms subframe duration.

Figure 19:
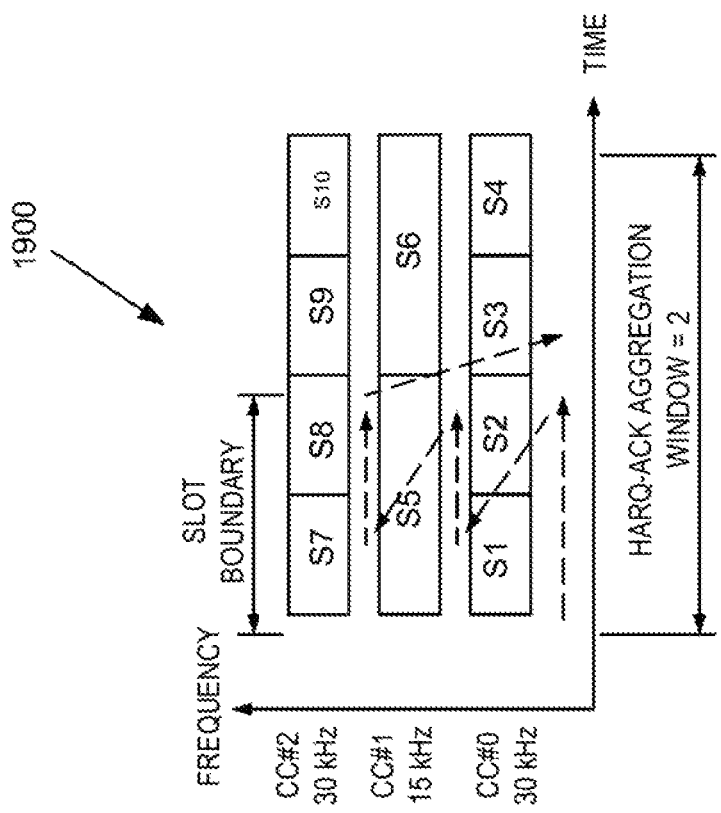
FIG. 19 is a NR signaling diagram illustrating another embodiment for cross-carrier multiple-slot scheduling involving a HARQ-ACK feedback with its bits ordered in the UCI such that they are incremented in a time first manner, and then after reaching a slot boundary, in a frequency manner.

FIG. 19 illustrates an example of the above embodiment for the order of HARQ-ACK bits for carrier aggregation with different numerologies or TTI durations. In the example, the NR signaling diagram 1900 is similar to the one shown in FIGS. 18a and 18b, with respective CCs having identical numerologies. In addition, similar to the embodiments of FIGS. 18a and 18b, the slot boundary in the embodiment of FIG. 19 is defined using 15 kHz SC in CC #1. Here, the bits in the HARQ-ACK will track the data transmissions in the CC's starting at 51 of CC #0 to S2 of CC #0 until they reach the slot boundary 1903 defined with respect to the slot duration of CC #1, which has the shortest subcarrier spacing of 15 KHz. Then, the bits will track S5 of CC #1 and once the slot boundary 1903 is reached again, the bits will track S7 of CC #2, then S8 of CC #2, at which time, once reaching the slot boundary 1903 again, they will move to track S3, S4, S6, S9 and S10 in the same manner.

In another embodiment, when different numerologies or TTI durations are employed for multiple CCs, HARQ-ACK feedback for respective numerologies or TTI durations may be grouped and transmitted on PUCCH in respective corresponding PUCCH on SCell. In other words, according to this embodiment, only HARQ-ACK feedback for the same numerology or TTI duration may be aggregated and carried by the same PUCCH SCell. The above embodiment may be applied in the case of both semi-static HARQ-ACK codebook determination as described above, and of dynamic HARQ-ACK codebook determination to be described below.

In the event that the number of PUCCH SCells is smaller than the number of numerologies or TTI durations among configured CCs, some dropping or priority rules may be defined to allow a UE to drop some PUCCHs on PUCCH SCell(s). The dropping rule may be defined in the order of subcarrier spacing among CCs. For instance, smallest subcarrier spacing may have highest priority and largest subcarrier spacing may have lowest priority. Alternatively, the dropping rule may be configured by higher layers via NR MSI, NR RMSI, NR OSI or RRC signaling, or may be defined according to the UE's capability.

Dynamic HARQ-ACK Codebook for Carrier Aggregation with Same or Mixed Numerologies or TTI Duration:

Using the static HARQ-ACK codebook where different numerologies or TTI durations are used as between configured CCs, as suggested by FIGS. 18a, 18b and 19, results in a HARQ-ACK feedback that uses bits to correspond to slots that may or may not be scheduled with data. In order to save resources with respect to a HARQ-ACK codebook, a dynamic HARQ-ACK mechanism for carrier aggregation may be used to allow the HARQ-ACK feedback to use bits only for scheduled slots that are used to carry data.

For dynamic HARQ-ACK codebook for carrier aggregation, both counter downlink assignment index (C-DAI) and total DAI (T-DAI) may be indicated in the DCI of the PDCCH for the scheduling of DL data transmission on multiple CCs. Further, the size of C-DAI and T-DAI may be fixed, e.g., 2 bits, respectively. Although in the following embodiments, both C-DAI and T-DAI are employed, in some cases, only C-DAI may be used for dynamic HARQ-ACK determination.

The DAI may be divided into two types, i.e., a counter-DAI (C-DAI) and a total-DAI (T-DAI). The C-DAI may have a successively increasing value for PDSCH data transmissions scheduled for different cells in the same subframe. Alternatively, the C-DAI may have a successively increasing value for PDSCH data transmissions scheduled for different cells in different subframes. The T-DAI may have a value which increases for each subframe in which the PDSCH data is scheduled for each cell. For dynamic HARQ-ACK codebook determination, if spatial bundling is not configured, 2 HARQ-ACK bits may be reported per serving cell regardless of transmission mode as long as there is at least one serving cell configured with a transmission mode supporting 2 transport blocks (TB). The above may help to avoid ambiguity on the total number of HARQ-ACK bits between a gNB and a UE.

Some embodiments of dynamic HARQ-ACK codebook for carrier aggregation with same or mixed numerologies will be described below in relation to FIGS. 20a, 20b and 20c.

Where different numerologies or TTI durations are employed for multiple CCs, the HARQ-ACK aggregation window may according to some embodiments be defined with regard to the slot duration according to a predetermined subcarrier spacing (for example, a largest or a smallest subcarrier spacing) or predetermined TTI durations among configured CCs, or according to a 1 ms subframe duration. Example embodiments for ordering bits in the HARQ-ACK feedback for transmission in CCs with different numerologies or TTI durations are described below in relation to FIGS. 20a-20c below.

Figure 20A:
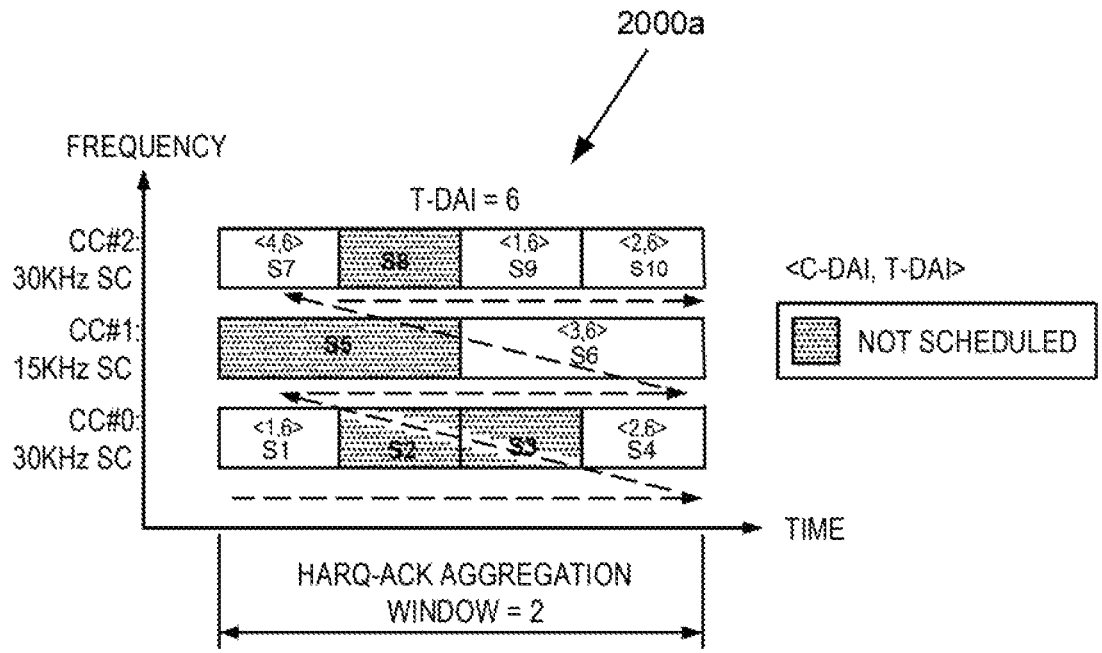
FIG. 20a is a NR signaling diagram illustrating an embodiment for dynamic cross-carrier multiple-slot scheduling involving a HARQ-ACK feedback with its bits ordered in a time first frequency second manner.
Figure 20B:
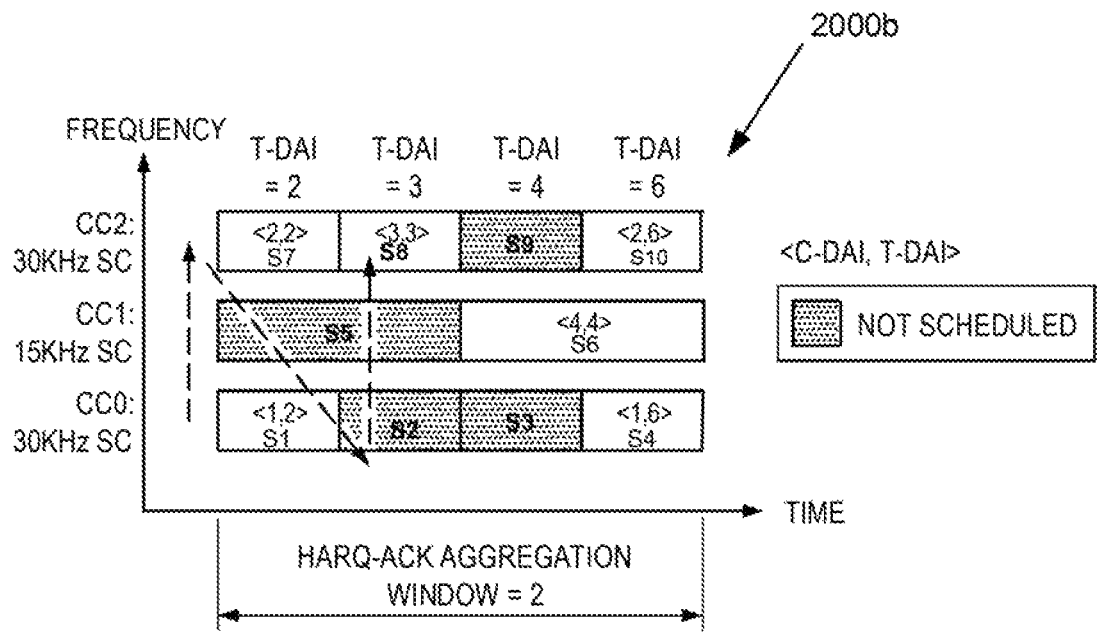
FIG. 20b is a NR signaling diagram illustrating an embodiment for dynamic cross-carrier multiple-slot scheduling involving a HARQ-ACK feedback with its bits ordered in a frequency first time second manner.
Figure 20C:
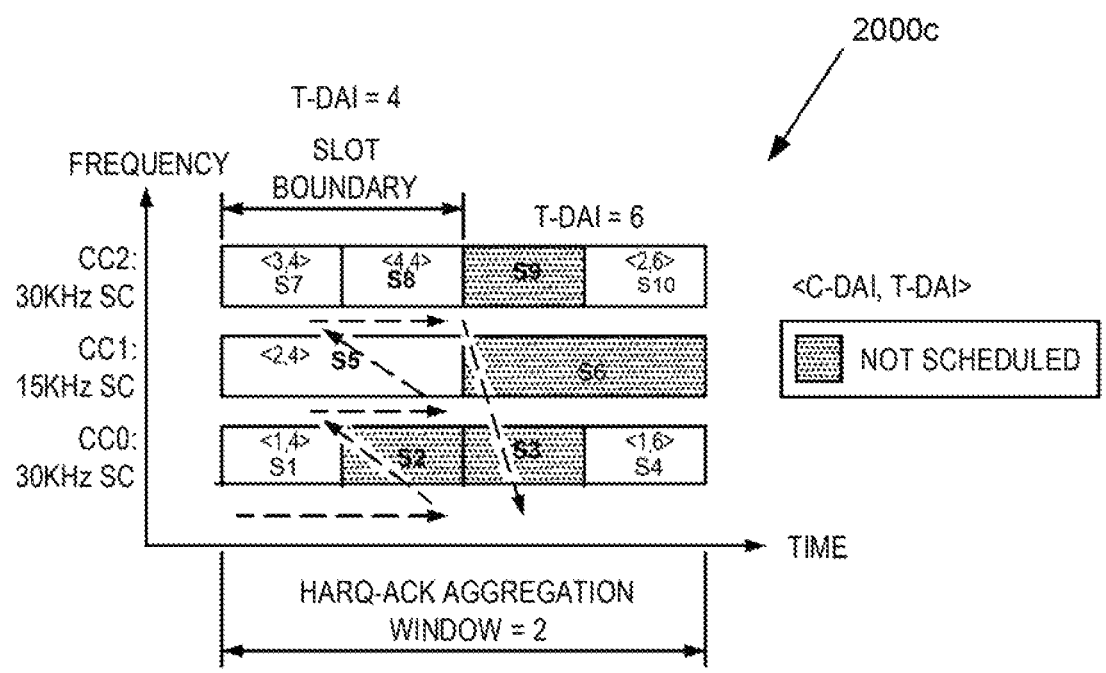
FIG. 20c is a NR signaling diagram illustrating an embodiment for dynamic cross-carrier multiple-slot scheduling involving a HARQ-ACK feedback with its bits ordered in the UCI such that they are incremented in a time first manner, and then after reaching a slot boundary, in a frequency manner.

In particular, FIGS. 20a-20c depict various options for C-DAI and T-DAI mapping for different numerologies or TTI durations. As seen in those figures, C-DAI may, according to an embodiment, be incremented in time-first-frequency-second manner or frequency-first-time-second manner, or by using a hybrid of the two approaches. Further, where a frequency first time second approach is used, T-DAI for each slot may, according to one embodiment, be determined and increased in each slot up to the present slot. Furthermore, where different numerologies or TTI durations are used for multiple CCs, slot boundary may be based on largest subcarrier spacing or smallest TTI duration among scheduled or configured CCs, or it may be based on a 1 ms subframe duration. Alternatively, the slot boundary may be based on the smallest subcarrier spacing among configured or scheduled CCs or a 1 ms subframe duration. In this case, number of scheduled CCs may be counted for determining T-DAI within the slot duration using the smallest subcarrier spacing or 1 ms subframe duration.

Although as shown in FIGS. 20a-20c, T-DAI is shown as the exact total number of scheduled DL transmissions, in the DCI, it may, according to one embodiment, be signaled as a modulo operation. For instance, with a 2 bit T-DAI, the DCI may signal the T-DAI as mod(T-DAI+1,4).

FIGS. 20a-20c illustrate, in the form of respective NR signaling diagrams 2000a-2000c, respective embodiments for cross-carrier multiple-slot scheduling using dynamic HARQ-ACK codebook for carrier aggregation. In the shown examples, different numerologies or TTI durations are used as between CC #0 and CC #2 on the one hand, and CC #2 on the other hand, respectively. While CC #0 and CC #2 have subcarrier spacings corresponding to 30 KHz, CC #1 has a subcarrier spacing corresponding to 15 KHz. There are shown 4 slots S1 through S4 for CC #0, S5 and S6 for CC #1 and S7 through S10 for CC #2, with the aggregation window for the HARQ-ACK being defined, in the shown embodiments, with regard to slot duration according to the CC with the smallest subcarrier spacing, which, in the shown embodiment, corresponds to the slot spacing for CC #0 or CC #2 at 15 KHz. Therefore, here, the HARQ-ACK window corresponds to 2 slots in a 15 KHz subcarrier spacing CC. According to a dynamic HARQ-ACK codebook regime for carrier aggregation, the bits in the HARQ-ACK codebook that correspond to a DL slots for data transmission (i.e. that are to represent an ACK or a NACK for a DL data transmission) correspond only to the DL slots that are to contain scheduled data, and do not include any bits that correspond to unscheduled DL slots within the configured CCs.

Furthermore, where different numerologies or TTI durations are used for multiple CCs, slot boundary may be based on a largest subcarrier spacing or smallest TTI duration among scheduled or configured CCs (the case in FIG. 20c), or it may be based on a 1 ms subframe duration. Alternatively, the slot boundary may be based on the smallest subcarrier spacing among configured or scheduled CCs or a 1 ms subframe duration. The number of scheduled CCs may be counted for determining T-DAI within the slot duration (smallest or largest) noted above or a 1 ms subframe duration.

As seen in the NR signaling diagram 2000a of FIG. 20a, the HARQ-ACK feedback may have its bits ordered in the UCI in a time first frequency second manner as shown by the broken arrows in FIG. 20a. The bits in the HARQ-ACK, according to a dynamic regime will track the data transmissions in the CC's starting at S1 of CC #0 then S4 of CC #0, skipping unscheduled S2 and S3, then skip unscheduled S5 and track S6 in CC #1, then track S7 in CC #2, then skip unscheduled S8 and track S9 and S10.

In the case of FIG. 20a, where a time first frequency second approach is used, T-DAI for each slot may, according to one embodiment, be determined and increased in each slot up to the present slot. For example, in FIG. 20a, the T-DAI for the first slot duration within the HARQ-ACK window (based on the smallest subcarrier spacing of 15 KHz) is 6 scheduled slots. The C-DAI may have a successively increasing value for different scheduled CC slot in a frequency first time second manner. It is noted that the C-DAI may not go beyond the value of 4, and therefore reverts back to 1 when it is to have reached 5 as shown and is incremented then starting again from 1.

As seen in the NR signaling diagram 2000b of FIG. 20b, the HARQ-ACK feedback may have its bits ordered in the UCI in a frequency first time second manner as shown by the broken arrows in FIG. 20b. The bits in the HARQ-ACK, according to a dynamic regime will track the data transmissions in the CC's starting at S1 of CC #0, then skipping unscheduled S5 in CC #1, track S7 in CC #2, then skip unscheduled S2 in CC #0, then skip unscheduled S5 in CC #1, then track S8 in CC #2, then skip unscheduled S3 in CC #0, then track S6 in CC #1, then skip unscheduled S9 in CC #2, then track S4 in CC #0, S6 in CC #1 and S10 in CC #2.

In the case of FIG. 20b, where a frequency first time second approach is used, T-DAI for each slot may, according to one embodiment, be determined and increased in each slot up to the present slot. For example, in FIG. 20b, the T-DAI for the first slot duration within the HARQ-ACK window (based on the largest subcarrier spacing of 30 KHz) is 2 (2 scheduled slots); the T-DAI for the second slot duration within the HARQ-ACK window is 3 (2 scheduled slots from the first slot duration, and one scheduled slot from the second slot duration); the T-DAI for the third slot duration within the HARQ-ACK window is 4 (2 scheduled slots from the first slot duration, 1 scheduled slot from the second slot duration, and 1 scheduled slot in the third slot duration); the T-DAI for the fourth and last slot duration within the HARQ-ACK window is 6 (2 scheduled slots from the first slot duration, 1 scheduled slot from the second slot duration, 1 scheduled slot in the third slot duration, and 2 scheduled slots in the fourth slot duration). Furthermore, where different numerologies or TTI durations are used for multiple CCs, slot boundary may be based on a largest subcarrier spacing or smallest TTI duration among scheduled or configured CCs (the case in FIG. 20c), or it may be based on a 1 ms subframe duration. Alternatively, the slot boundary may be based on the smallest subcarrier spacing among configured or scheduled CCs or a 1 ms subframe duration. In this case, number of scheduled CCs may be counted for determining T-DAI within the slot duration using the smallest subcarrier spacing or 1 ms subframe duration.

As seen in the NR signaling diagram 2000c of FIG. 20c, a hybrid of the approaches in FIGS. 20a and 20b may be used. According to this embodiment, the order of HARQ-ACK bits may be incremented in a time first manner, and then after it reaches a slot boundary, it may be incremented in a frequency manner. Subsequently, after it reaches all the configured CCs within the slot time, it is incremented in the time manner again. In FIG. 20c, the bits in the HARQ-ACK will track the data transmissions in the CC's starting at 51 of CC #0 then skipping unscheduled S2 of CC #0 until it reaches the slot boundary 2003 defined with respect to the slot duration of CC #1, which has the shortest subcarrier spacing of 15 KHz. Then, the bits will track S5 of CC #1 and once the slot boundary 2003 is reached again, the bits will track S7 of CC #2, then S8 of CC #2, at which time, once reaching the slot boundary 1903 again, they will move to track S3, S4, S6, S9 and S10 in the same manner.

For the embodiment of FIG. 20c, T-DAI for each slot may, according to one embodiment, be determined and increased in each slot up to the present slot. Here, the slot boundary is based on a time first frequency second manner for a first slot duration and then for a second slot duration. In FIG. 20c, the slot duration is based on a smallest subcarrier spacing of 15 KHz. The T-DAI for the first slot duration is 4 scheduled slots, and for the second slot duration is 6 scheduled slots (the 4 scheduled slots from the first slot duration, and 2 scheduled slots from the second slot duration).

According to a different embodiment, where the same numerology or TTI duration is employed for multiple CCs, the C-DAI may be incremented in a frequency-first-time-second manner or time-first-frequency-second manner for both TDD and FDD. Further, in the case of a frequency first time second approach, the T-DAI for each slot may be determined and increased in each scheduled slot up to the present scheduled slot, where the slot duration may be based on subcarrier spacing among scheduled or configured CCs, or it may be based on a 1 ms subframe duration. In the case of a time first frequency second approach, a single T-DAI within a HARQ-ACK aggregation window may be determined based on a total number of scheduled CCs within a HARQ-ACK aggregation window. In the case of a time first frequency second approach, a single T-DAI within a HARQ-ACK aggregation window may be determined based on total number of scheduled CCs within HARQ-ACK aggregation window, where the HARQ-ACK aggregation window may be defined in accordance with smallest subcarrier spacing or largest TTI duration among CCs.

EXAMPLES

Example 1 includes an apparatus of a base station, the apparatus including a memory storing logic, and processing circuitry coupled to the memory to implement the logic to: determine a physical downlink control channel (PDCCH) on a first component carrier; encode a first signal to be transmitted on the PDCCH, the first signal including downlink control information (DCI) on resources for a second signal to be transmitted on a second component carrier, wherein the DCI is based on a predetermined numerology, and wherein respective numerologies of the first component carrier and the second component carrier are different from one another; and cause transmission of the first signal on the PDCCH, wherein a receiver of the second signal is to process the second signal based on the control information in the first signal.

Example 2 includes the apparatus of Example 1, and optionally, wherein the downlink control information includes scheduling information regarding a scheduling of the resources for a data signal, the second signal includes the data signal, and the processing circuitry is further to: determine a physical downlink shared channel (PDSCH) on the second component carrier; encode the data signal for transmission on the PDSCH; and cause transmission of the data signal to the receiver based on the downlink control information.

Example 3 includes the apparatus of Example 1, and optionally, wherein the downlink control information includes scheduling information regarding a scheduling of the resources for a data signal, the second signal is a data signal and the base station is a receiver of the second signal, the processing circuitry further to: detect a physical uplink shared channel (PUSCH) on the second component carrier; and decode the data signal received on the PUSCH based on the downlink control information.

Example 4 includes the apparatus of Example 2, and optionally, wherein the downlink control information includes scheduling information regarding a scheduling of the resources for a hybrid automatic repeat request-acknowledge feedback (HARQ-ACK) signal, the second signal includes the HARQ-ACK signal and the base station is a receiver of the second signal, the processing circuitry further to: determine a physical downlink shared channel (PDSCH); encode a data signal for transmission on the PDSCH; cause transmission of the data signal; detect a physical uplink control channel (PUCCH) on the second component carrier, the PUCCH being on a primary cell (PCell) or on a PUCCH secondary cell (SCell); and decode the HARQ-ACK signal received on the PUCCH based on the downlink control information, the HARQ-ACK signal associated with the data signal on the PDSCH.

Example 5 includes the apparatus of Example 1, and optionally, wherein the downlink control information includes slot indices of a transmission of the second signal to indicate slots of the resources.

Example 6 includes the apparatus of Example 5, and optionally, wherein DCI includes a joint resource allocation field to indicate the downlink control information, and the downlink control information includes information on the slots and on symbols within the slots.

Example 7 includes the apparatus of Example 1, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 8 includes the apparatus of Example 1, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, physical uplink shared channel PUSCH or physical uplink control channel (PUCCH) carrying a hybrid automatic repeat request-acknowledge feedback (HARQ-ACK) signal is transmitted.

Example 9 includes the subject matter of Example 1, and optionally, wherein the downlink control information includes scheduling information regarding a scheduling of the resources for a data signal, the second signal includes the data signal, and the downlink control information comprises mini-slot information including symbol indices to indicate symbols of the resources.

Example 10 includes the subject matter of any one of examples 1-3, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 11 includes the subject matter of any one of Examples 1-3, and optionally, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 12 includes the subject matter of Example 4, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the PUCCH is transmitted; or always a 15 kHz numerology.

Example 13 includes the subject matter of Example 4, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 14 includes the subject matter of Example 1, and optionally, wherein: the downlink control information includes scheduling information regarding a scheduling of the resources for a data signal; the second signal includes the data signal; and the resources include multiple slots.

Example 15 includes the subject matter of Example 14, and optionally, wherein the downlink control information includes slot group indices to indicate respective groups of slots of the multiple slots.

Example 16 includes the subject matter of Example 1, and optionally, wherein: the first signal includes a first stage downlink control information signal (DCI) on the PDCCH; the downlink control information is a first stage DCI; the processing circuitry is to further: encode a second stage DCI for transmission on the PDSCH, the second stage DCI including second stage DCI on the resources; and cause transmission of the first stage DCI and the second stage DCI to the receiver; cause transmission of a data signal to the receiver based on the first stage DCI and the second stage DCI.

Example 17 includes the subject matter of any one of Examples 2-3, and optionally, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 18 includes the subject matter of Example 1, and optionally, wherein the resources include a size of and order of bits in a hybrid automatic repeat request-acknowledge feedback (HARQ-ACK) signal, the second signal includes the HARQ-ACK signal and the base station is a receiver of the second signal, the processing circuitry further to: determine a physical downlink shared channel (PDSCH); encode a data signal for transmission on the PDSCH; cause transmission of the data signal; detect a physical uplink control channel (PUCCH) on the second component carrier, the PUCCH being on a primary cell (PCell) or on a PUCCH secondary cell (SCell); and decode the HARQ-ACK signal based on the control information, the HARQ-ACK signal received on the PUCCH and associated with the data signal on the PDSCH.

Example 19 includes the subject matter of claim 18, and optionally, wherein the processing circuitry is further to encode and cause to transmit a dedicated Radio Resource Control signal (RRC signal), the RRC signal indicating a number of configured component carriers including the first component carrier and the second component carrier and a size of a HARQ-ACK aggregation window for the HARQ-ACK signal.

Example 20 includes the subject matter of Example 18, and optionally, wherein the first signal includes a downlink control information (DCI) signal, and the processing circuitry is further to at least one of configure a HARQ-ACK aggregation window size for the HARQ-ACK signal via a NR minimum system information (MSI), NR remaining minimum system information (RMSI), NR other system information (OSI) or radio resource control (RRC) signaling, or indicate the HARQ-ACK aggregation window size in the DCI.

Example 21 includes the subject matter of Example 18, and optionally, wherein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding slot for the PDSCH.

Example 22 includes the subject matter of Example 21, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured component carriers including the first component carrier and the second component carrier; or always a 1 ms subframe duration.

Example 23 includes the subject matter of Example 18, and optionally, wherein the HARQ-ACK feedback includes an aggregation of HARQ-ACK feedbacks, each of the HARQ-ACK feedbacks on a respective PCell or PUCCH SCell with a corresponding numerology, each of the corresponding numerologies further corresponding to a numerology of a data signal associated with each of the HARQ-ACK feedbacks.

Example 24 includes the subject matter of Example 18, and optionally, wherein the HARQ-ACK feedback is based: on a static HARQ-ACK codebook based on which the size of and order of bits in the HARQ-ACK feedback correspond to all slots of PDSCH; or a dynamic HARQ-ACK codebook based on which the size of and order of bits in the HARQ-ACK feedback correspond only to scheduled slots of the PDSCH.

Example 25 includes the subject matter of Example 24, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 26 includes the subject matter of Example 25, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 27 includes the subject matter of Example 1, and optionally, further including a front-end module coupled to the processing circuitry.

Example 28 includes the subject matter of Example 1, and optionally, further including at least one antenna coupled to the front-end module.

Example 29 includes the subject matter of Example 28, and optionally, further including a NR evolved node B (gNodeB).

Example 30 is a product comprising one or more tangible computer-readable non-transitory storage media comprising computer-executable instructions operable to, when executed by at least one computer processor of a base station, enable the at least one computer processor to implement operations at the base station, the operations including: determining a physical downlink control channel (PDCCH) on a first component carrier; encoding a first signal to be transmitted on the PDCCH, the first signal including downlink control information (DCI) on resources for a second signal to be transmitted on a second component carrier, wherein the DCI is based on a predetermined numerology, and wherein respective numerologies of the first component carrier and the second component carrier are different from one another; and causing transmission of the first signal on the PDCCH, wherein a receiver of the second signal is to process the second signal based on the control information in the first signal.

Example 31 includes the subject matter of Example 30, and optionally, wherein the downlink control information includes scheduling information regarding a scheduling of the resources for a data signal, the second signal includes the data signal, and the operations further include: determining a physical downlink shared channel (PDSCH) on the second component carrier; encoding the data signal for transmission on the PDSCH; and causing transmission of the data signal to the receiver based on the downlink control information.

Example 32 includes the subject matter of Example 30, and optionally, wherein the downlink control information includes scheduling information regarding a scheduling of the resources for a data signal, the second signal is a data signal and the base station is a receiver of the second signal, the operations further including: detecting a physical uplink shared channel (PUSCH) on the second component carrier; and decoding the data signal received on the PUSCH based on the downlink control information.

Example 33 includes the subject matter of Example 31, and optionally, wherein the downlink control information includes scheduling information regarding a scheduling of the resources for a hybrid automatic repeat request-acknowledge feedback (HARQ-ACK) signal, the second signal includes the HARQ-ACK signal and the base station is a receiver of the second signal, the operations further including: determining a physical downlink shared channel (PDSCH); encoding a data signal for transmission on the PDSCH; causing transmission of the data signal; detecting a physical uplink control channel (PUCCH) on the second component carrier, the PUCCH being on a primary cell (PCell) or on a PUCCH secondary cell (SCell); and decoding the HARQ-ACK signal received on the PUCCH based on the downlink control information, the HARQ-ACK signal associated with the data signal on the PDSCH.

Example 34 includes the subject matter of Example 30, and optionally, wherein the downlink control information includes slot indices of a transmission of the second signal to indicate slots of the resources.

Example 35 includes the subject matter of Example 34, and optionally, wherein DCI includes a joint resource allocation field to indicate the downlink control information, and the downlink control information includes information on the slots and on symbols within the slots.

Example 36 includes the subject matter of Example 30, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 37 includes the subject matter of Example 30, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, physical uplink shared channel PUSCH or physical uplink control channel (PUCCH) carrying a hybrid automatic repeat request-acknowledge feedback (HARQ-ACK) signal is transmitted.

Example 38 includes the subject matter of Example 30, and optionally, wherein the downlink control information includes scheduling information regarding a scheduling of the resources for a data signal, the second signal includes the data signal, and the downlink control information comprises mini-slot information including symbol indices to indicate symbols of the resources.

Example 39 includes the subject matter of any one of Examples 30-32, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 40 includes the subject matter of any one of Examples 30-32, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 41 includes the subject matter of Example 33, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the PUCCH is transmitted; or always a 15 kHz numerology.

Example 42 includes the subject matter of Example 33, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 43 includes the subject matter of Example 30, and optionally, wherein: the downlink control information includes scheduling information regarding a scheduling of the resources for a data signal; the second signal includes the data signal; and the resources include multiple slots.

Example 44 includes the subject matter of Example 43, and optionally, wherein the downlink control information includes slot group indices to indicate respective groups of slots of the multiple slots.

Example 45 includes the subject matter of Example 30, and optionally, wherein: the first signal includes a first stage downlink control information signal (DCI) on the PDCCH; the downlink control information is a first stage DCI; the operations further include: encoding a second stage DCI for transmission on the PDSCH, the second stage DCI including second stage DCI on the resources; causing transmission of the first stage DCI and the second stage DCI to the receiver; and causing transmission of a data signal to the receiver based on the first stage DCI and the second stage DCI.

Example 46 includes the subject matter of any one of Examples 31-32, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 47 includes the subject matter of Example 30, and optionally, wherein the resources include a size of and order of bits in a hybrid automatic repeat request-acknowledge feedback (HARQ-ACK) signal, the second signal includes the HARQ-ACK signal and the base station is a receiver of the second signal, the operations further including: determining a physical downlink shared channel (PDSCH); encoding a data signal for transmission on the PDSCH; causing transmission of the data signal; detecting a physical uplink control channel (PUCCH) on the second component carrier, the PUCCH being on a primary cell (PCell) or on a PUCCH secondary cell (SCell); and decoding the HARQ-ACK signal based on the control information, the HARQ-ACK signal received on the PUCCH and associated with the data signal on the PDSCH.

Example 48 includes the subject matter of Example 47, and optionally, wherein the operations further include encoding and causing to transmit a dedicated Radio Resource Control signal (RRC signal), the RRC signal indicating a number of configured component carriers including the first component carrier and the second component carrier and a size of a HARQ-ACK aggregation window for the HARQ-ACK signal.

Example 49 includes the subject matter of Example 47, and optionally, wherein the first signal includes a downlink control information (DCI) signal, and the operations further include at least one of configure a HARQ-ACK aggregation window size for the HARQ-ACK signal via a NR minimum system information (MSI), NR remaining minimum system information (RMSI), NR other system information (OSI) or radio resource control (RRC) signaling, or indicate the HARQ-ACK aggregation window size in the DCI.

Example 50 includes the subject matter of Example 47, and optionally, wherein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding slot for the PDSCH.

Example 51 includes the subject matter of Example 50, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured component carriers including the first component carrier and the second component carrier; or always a 1 ms subframe duration.

Example 52 includes the subject matter of Example 47, and optionally, wherein the HARQ-ACK feedback includes an aggregation of HARQ-ACK feedbacks, each of the HARQ-ACK feedbacks on a respective PCell or PUCCH SCell with a corresponding numerology, each of the corresponding numerologies further corresponding to a numerology of a data signal associated with each of the HARQ-ACK feedbacks.

Example 53 includes the subject matter of Example 47, and optionally, wherein the HARQ-ACK feedback is based: on a static HARQ-ACK codebook based on which the size of and order of bits in the HARQ-ACK feedback correspond to all slots of PDSCH; or a dynamic HARQ-ACK codebook based on which the size of and order of bits in the HARQ-ACK feedback correspond only to scheduled slots of the PDSCH.

Example 54 includes the subject matter of Example 53, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 55 includes the subject matter of Example 54, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 56 includes a method to be performed at a processing circuitry of a base station, the method comprising: determining a physical downlink control channel (PDCCH) on a first component carrier; encoding a first signal to be transmitted on the PDCCH, the first signal including downlink control information (DCI) on resources for a second signal to be transmitted on a second component carrier, wherein the DCI is based on a predetermined numerology, and wherein respective numerologies of the first component carrier and the second component carrier are different from one another; and causing transmission of the first signal on the PDCCH, wherein a receiver of the second signal is to process the second signal based on the control information in the first signal.

Example 57 includes the subject matter of Example 56, and optionally, wherein the downlink control information includes scheduling information regarding a scheduling of the resources for a data signal, the second signal includes the data signal, the method further including: determining a physical downlink shared channel (PDSCH) on the second component carrier; encoding the data signal for transmission on the PDSCH; and causing transmission of the data signal to the receiver based on the downlink control information.

Example 58 includes the subject matter of Example 56, and optionally, wherein the downlink control information includes scheduling information regarding a scheduling of the resources for a data signal, the second signal is a data signal and the base station is a receiver of the second signal, the method further including: detecting a physical uplink shared channel (PUSCH) on the second component carrier; and decoding the data signal received on the PUSCH based on the downlink control information.

Example 59 includes the subject matter of Example 57, and optionally, wherein the downlink control information includes scheduling information regarding a scheduling of the resources for a hybrid automatic repeat request-acknowledge feedback (HARQ-ACK) signal, the second signal includes the HARQ-ACK signal and the base station is a receiver of the second signal, the method further including: determining a physical downlink shared channel (PDSCH); encoding a data signal for transmission on the PDSCH; causing transmission of the data signal; detecting a physical uplink control channel (PUCCH) on the second component carrier, the PUCCH being on a primary cell (PCell) or on a PUCCH secondary cell (SCell); and decoding the HARQ-ACK signal received on the PUCCH based on the downlink control information, the HARQ-ACK signal associated with the data signal on the PDSCH.

Example 60 includes the subject matter of Example 56, and optionally, wherein the downlink control information includes slot indices of a transmission of the second signal to indicate slots of the resources.

Example 61 includes the subject matter of Example 60, and optionally, wherein DCI includes a joint resource allocation field to indicate the downlink control information, and the downlink control information includes information on the slots and on symbols within the slots.

Example 62 includes the subject matter of Example 56, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 63 includes the subject matter of Example 56, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, physical uplink shared channel PUSCH or physical uplink control channel (PUCCH) carrying a hybrid automatic repeat request-acknowledge feedback (HARQ-ACK) signal is transmitted.

Example 64 includes the subject matter of Example 56, and optionally, wherein the downlink control information includes scheduling information regarding a scheduling of the resources for a data signal, the second signal includes the data signal, and the downlink control information comprises mini-slot information including symbol indices to indicate symbols of the resources.

Example 65 includes the method of any one of Examples 56-58, and optionally, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 66 includes the method of any one of Examples 56-58, and optionally, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 67 includes the subject matter of Example 59, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the PUCCH is transmitted; or always a 15 kHz numerology.

Example 68 includes the subject matter of Example 59, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 69 includes the subject matter of Example 56, and optionally, wherein: the downlink control information includes scheduling information regarding a scheduling of the resources for a data signal; the second signal includes the data signal; and the resources include multiple slots.

Example 70 includes the subject matter of Example 69, and optionally, wherein the downlink control information includes slot group indices to indicate respective groups of slots of the multiple slots.

Example 71 includes the subject matter of Example 56, and optionally, wherein: the first signal includes a first stage downlink control information signal (DCI) on the PDCCH; the downlink control information is a first stage DCI; the method further includes: encoding a second stage DCI for transmission on the PDSCH, the second stage DCI including second stage DCI on the resources; causing transmission of the first stage DCI and the second stage DCI to the receiver; and causing transmission of a data signal to the receiver based on the first stage DCI and the second stage DCI.

Example 72 includes the method of any one of Examples 57-58, and optionally, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 73 includes the subject matter of Example 56, and optionally, wherein the resources include a size of and order of bits in a hybrid automatic repeat request-acknowledge feedback (HARQ-ACK) signal, the second signal includes the HARQ-ACK signal and the base station is a receiver of the second signal, the method further including: determining a physical downlink shared channel (PDSCH); encoding a data signal for transmission on the PDSCH; causing transmission of the data signal; detecting a physical uplink control channel (PUCCH) on the second component carrier, the PUCCH being on a primary cell (PCell) or on a PUCCH secondary cell (SCell); and decoding the HARQ-ACK signal based on the control information, the HARQ-ACK signal received on the PUCCH and associated with the data signal on the PDSCH.

Example 74 includes the subject matter of Example 73, and optionally, wherein the method further includes encoding and causing to transmit a dedicated Radio Resource Control signal (RRC signal), the RRC signal indicating a number of configured component carriers including the first component carrier and the second component carrier and a size of a HARQ-ACK aggregation window for the HARQ-ACK signal.

Example 75 includes the subject matter of Example 73, and optionally, wherein the first signal includes a downlink control information (DCI) signal, the method further including at least one of configure a HARQ-ACK aggregation window size for the HARQ-ACK signal via a NR minimum system information (MSI), NR remaining minimum system information (RMSI), NR other system information (OSI) or radio resource control (RRC) signaling, or indicate the HARQ-ACK aggregation window size in the DCI.

Example 76 includes the subject matter of Example 73, and optionally, wherein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding slot for the PDSCH.

Example 77 includes the subject matter of Example 76, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured component carriers including the first component carrier and the second component carrier; or always a 1 ms subframe duration.

Example 78 includes the subject matter of Example 73, and optionally, wherein the HARQ-ACK feedback includes an aggregation of HARQ-ACK feedbacks, each of the HARQ-ACK feedbacks on a respective PCell or PUCCH SCell with a corresponding numerology, each of the corresponding numerologies further corresponding to a numerology of a data signal associated with each of the HARQ-ACK feedbacks.

Example 79 includes the subject matter of Example 73, and optionally, wherein the HARQ-ACK feedback is based: on a static HARQ-ACK codebook based on which the size of and order of bits in the HARQ-ACK feedback correspond to all slots of PDSCH; or a dynamic HARQ-ACK codebook based on which the size of and order of bits in the HARQ-ACK feedback correspond only to scheduled slots of the PDSCH.

Example 80 includes the subject matter of Example 79, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 81 includes the subject matter of Example 80, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 82 includes an apparatus of a base station comprising: means for determining a physical downlink control channel (PDCCH) on a first component carrier; means for encoding a first signal to be transmitted on the PDCCH, the first signal including downlink control information (DCI) on resources for a second signal to be transmitted on a second component carrier, wherein the DCI is based on a predetermined numerology, and wherein respective numerologies of the first component carrier and the second component carrier are different from one another; and means for causing transmission of the first signal on the PDCCH, wherein a receiver of the second signal is to process the second signal based on the control information in the first signal.

Example 83 includes the apparatus of Example 82, and optionally, wherein the downlink control information includes scheduling information regarding a scheduling of the resources for a data signal, the second signal includes the data signal, the apparatus including: means for determining a physical downlink shared channel (PDSCH) on the second component carrier; means for encoding the data signal for transmission on the PDSCH; and means for causing transmission of the data signal to the receiver based on the downlink control information.

Example 84 includes the apparatus of Example 82, and optionally, wherein the downlink control information includes scheduling information regarding a scheduling of the resources for a data signal, the second signal is a data signal and the base station is a receiver of the second signal, the apparatus including: means for detecting a physical uplink shared channel (PUSCH) on the second component carrier; and means for decoding the data signal received on the PUSCH based on the downlink control information.

Example 85 includes an apparatus of a User Equipment, the apparatus including a memory storing logic, and processing circuitry coupled to the memory to implement the logic to: detect a physical downlink control channel (PDCCH) on a first component carrier; and decode a first signal from a base station on the PDCCH, the first signal including downlink control information on resources for a second signal to be transmitted on a second component carrier, wherein the DCI is based on a predetermined numerology, and respective numerologies of the first component carrier and the second component carrier are different from one another, and further wherein a receiver of the second signal is to process the second signal based on the downlink control information in the first signal.

Example 86 includes the subject matter of Example 85, and optionally, wherein the UE is a receiver of the second signal, the downlink control information includes scheduling information regarding a scheduling of the resources for a data signal, the second signal includes the data signal, the processing circuitry further to: detect a physical downlink shared channel (PDSCH) on the second component carrier; and decode the data signal based on the downlink control information.

Example 87 includes the subject matter of Example 85, and optionally, wherein the downlink control information includes scheduling information regarding a scheduling of the resources for a data signal, the second signal is a data signal and the base station is a receiver of the second signal, the processing circuitry further to: determine a physical uplink shared channel (PUSCH) on the second component carrier; encode the data signal based on the control information; and cause transmission of the data signal on the PUSCH to a NR evolved Node B (gNB).

Example 88 includes the subject matter of Example 86, and optionally, wherein the downlink control information includes scheduling information regarding a scheduling of the resources for a hybrid automatic repeat request-acknowledge feedback (HARQ-ACK) signal, the second signal includes the HARQ-ACK signal and the UE is a receiver of the second signal, the processing circuitry further to: detect a physical downlink shared channel (PDSCH); decode a data signal for transmission on the PDSCH; determine a physical uplink control channel (PUCCH) on the second component carrier, the PUCCH being on a primary cell (PCell) or on a PUCCH secondary cell (SCell); encode the HARQ-ACK signal based on the control information, the HARQ-ACK signal associated with the data signal on the PDSCH; and cause transmission of the HARQ-ACK signal on the PUCCH.

Example 89 includes the subject matter of Example 85, and optionally, wherein the downlink control information includes slot indices for transmission of the second signal to indicate slots of the resources.

Example 90 includes the subject matter of Example 89, and optionally, wherein DCI includes a joint resource allocation field to indicate the control information, and the downlink control information includes information on the slots and on symbols within the slots.

Example 91 includes the subject matter of Example 85, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 92 includes the subject matter of Example 85, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, Physical Uplink Shared Channel (PUSCH) or Physical Uplink Control Channel (PUCCH) carrying a hybrid automatic repeat request-acknowledge feedback (HARQ-ACK) signal is transmitted.

Example 93 includes the subject matter of Example 85, and optionally, wherein the downlink control information includes scheduling information regarding a scheduling of the resources for a data signal, the second signal includes the data signal, and the downlink control information comprises mini-slot information including symbol indices to indicate symbols of the resources.

Example 94 includes the subject matter of any one of Examples 85-87, and optionally, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 95 includes the subject matter of any one of Examples 85-87, and optionally, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 96 includes the subject matter of Example 88, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the physical uplink control channel (PUCCH) is transmitted; or always a 15 kHz numerology.

Example 97 includes the subject matter of Example 88, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 98 includes the subject matter of Example 85, and optionally, wherein: the downlink control information includes scheduling information regarding a scheduling of the resources for a data signal; the second signal includes the data signal; and the resources include multiple slots.

Example 99 includes the subject matter of Example 98, and optionally, wherein the downlink control information includes slot group indices to indicate respective groups of slots of the multiple slots.

Example 100 includes the subject matter of Example 98, and optionally, wherein: the first signal includes a first stage downlink control information signal (DCI) on the PDCCH; the downlink control information is a first stage DCI; the processing circuitry is to further: decode a second stage DCI on the PDSCH, the second stage DCI including second stage DCI on the resources; and decode the data signal based on the first stage DCI and the second stage DCI.

Example 101 includes the subject matter of any one of Examples 86-87, and optionally, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 102 includes the subject matter of Example 85, and optionally, wherein the resources include a size of and order of bits in a hybrid automatic repeat request-acknowledge feedback (HARQ-ACK) signal, the second signal includes the HARQ-ACK signal and the base station is a receiver of the second signal, the processing circuitry further to: detect a physical downlink shared channel (PDSCH); decode a data signal on the PDSCH; determine a physical uplink control channel (PUCCH) on the second component carrier, the PUCCH being on a primary cell (PCell) or on a PUCCH secondary cell (SCell); encode the HARQ-ACK signal based on the control information; and cause transmission of the HARQ-ACK signal to the base station on the PUCCH, the HARQ-ACK signal associated with the data signal on the PDSCH.

Example 103 includes the subject matter of Example 102, and optionally, wherein the operations further include process a dedicated Radio Resource Control signal (RRC signal), the RRC signal indicating a number of configured component carriers including the first component carrier and the second component carrier and a size of a HARQ-ACK aggregation window for the HARQ-ACK signal.

Example 104 includes the subject matter of Example 102, and optionally, wherein the first signal includes a downlink control information (DCI) signal, the processing circuitry further to at least one of determine a HARQ-ACK aggregation window size for the HARQ-ACK signal via a NR minimum system information (MSI), NR remaining minimum system information (RMSI), NR other system information (OSI) or radio resource control (RRC) signaling, or determine the HARQ-ACK aggregation window size from a DCI on the PDCCH.

Example 105 includes the subject matter of Example 102, and optionally, wherein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 106 includes the subject matter of Example 105, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured component carriers including the first component carrier and the second component carrier; or always a 1 ms subframe duration.

Example 107 includes the subject matter of Example 102, and optionally, wherein the HARQ-ACK feedback includes an aggregation of HARQ-ACK feedbacks, each of the HARQ-ACK feedbacks on a respective physical uplink control channel (PUCCH) SCell with a corresponding numerology, each of the corresponding numerologies further corresponding to a numerology of a data signal associated with each of the HARQ-ACK feedbacks.

Example 108 includes the subject matter of Example 102, and optionally, wherein the HARQ-ACK feedback is based: on a static HARQ-ACK codebook based on which the size of and order of bits in the HARQ-ACK feedback correspond to all slots of PDSCH; or a dynamic HARQ-ACK codebook based on which the size of and order of bits in the HARQ-ACK feedback correspond only to scheduled slots of the PDSCH.

Example 109 includes the subject matter of Example 108, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 110 includes the subject matter of Example 109, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 111 includes the subject matter of Example 85, and optionally, further including a front-end module coupled to the processing circuitry.

Example 112 includes the subject matter of Example 111, and optionally, further including at least one antenna coupled to the front-end module.

Example 113 includes the subject matter of Example 112, and optionally, further including the UE.

Example 114 includes a product comprising one or more tangible computer-readable non-transitory storage media comprising computer-executable instructions operable to, when executed by at least one computer processor of User Equipment (UE), enable the at least one computer processor to implement operations at the UE, the operations including: detecting a physical downlink control channel (PDCCH) on a first component carrier; and decoding a first signal from a base station on the PDCCH, the first signal including downlink control information on resources for a second signal to be transmitted on a second component carrier, wherein the DCI is based on a predetermined numerology, and respective numerologies of the first component carrier and the second component carrier are different from one another, and further wherein a receiver of the second signal is to process the second signal based on the downlink control information in the first signal.

Example 115 includes the subject matter of Example 114, and optionally, wherein the UE is a receiver of the second signal, the downlink control information includes scheduling information regarding a scheduling of the resources for a data signal, the second signal includes the data signal, the operations further including: detecting a physical downlink shared channel (PDSCH) on the second component carrier; and decoding the data signal based on the downlink control information.

Example 116 includes the subject matter of Example 114, and optionally, wherein the downlink control information includes scheduling information regarding a scheduling of the resources for a data signal, the second signal is a data signal and the base station is a receiver of the second signal, the operations further including: determining a physical uplink shared channel (PUSCH) on the second component carrier; encoding the data signal based on the control information; and causing transmission of the data signal on the PUSCH to a NR evolved Node B (gNB).

Example 117 includes the subject matter of Example 115, and optionally, wherein the downlink control information includes scheduling information regarding a scheduling of the resources for a hybrid automatic repeat request-acknowledge feedback (HARQ-ACK) signal, the second signal includes the HARQ-ACK signal and the UE is a receiver of the second signal, the operations further including: detecting a physical downlink shared channel (PDSCH); decoding a data signal for transmission on the PDSCH; determining a physical uplink control channel (PUCCH) on the second component carrier, the PUCCH being on a primary cell (PCell) or on a PUCCH secondary cell (SCell); encoding the HARQ-ACK signal based on the control information, the HARQ-ACK signal associated with the data signal on the PDSCH; and causing transmission of the HARQ-ACK signal on the PUCCH.

Example 118 includes the subject matter of Example 114, and optionally, wherein the downlink control information includes slot indices for transmission of the second signal to indicate slots of the resources.

Example 119 includes the subject matter of Example 118, and optionally, wherein DCI includes a joint resource allocation field to indicate the control information, and the downlink control information includes information on the slots and on symbols within the slots.

Example 120 includes the subject matter of Example 114, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 121 includes the subject matter of Example 114, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, Physical Uplink Shared Channel (PUSCH) or Physical Uplink Control Channel (PUCCH) carrying a hybrid automatic repeat request-acknowledge feedback (HARQ-ACK) signal is transmitted.

Example 122 includes the subject matter of Example 114, and optionally, wherein the downlink control information includes scheduling information regarding a scheduling of the resources for a data signal, the second signal includes the data signal, and the downlink control information comprises mini-slot information including symbol indices to indicate symbols of the resources.

Example 123 includes the subject matter of any one of Examples 114-116, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 124 includes the subject matter of any one of Examples 114-116, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 125 includes the subject matter of Example 117, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the physical uplink control channel (PUCCH) is transmitted; or always a 15 kHz numerology.

Example 126 includes the subject matter of Example 117, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 127 includes the subject matter of Example 114, and optionally, wherein: the downlink control information includes scheduling information regarding a scheduling of the resources for a data signal; the second signal includes the data signal; and the resources include multiple slots.

Example 128 includes the subject matter of Example 127, and optionally, wherein the downlink control information includes slot group indices to indicate respective groups of slots of the multiple slots.

Example 129 includes the subject matter of Example 127, and optionally, wherein: the first signal includes a first stage downlink control information signal (DCI) on the PDCCH; the downlink control information is a first stage DCI; the method further including: decoding a second stage DCI on the PDSCH, the second stage DCI including second stage DCI on the resources; and decoding the data signal based on the first stage DCI and the second stage DCI.

Example 130 includes the subject matter of any one of Examples 115-116, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 131 includes the subject matter of Example 114, and optionally, wherein the resources include a size of and order of bits in a hybrid automatic repeat request-acknowledge feedback (HARQ-ACK) signal, the second signal includes the HARQ-ACK signal and the base station is a receiver of the second signal, the operations further including: detecting a physical downlink shared channel (PDSCH); decoding a data signal on the PDSCH; determining a physical uplink control channel (PUCCH) on the second component carrier, the PUCCH being on a primary cell (PCell) or on a PUCCH secondary cell (SCell); encoding the HARQ-ACK signal based on the control information; and causing transmission of the HARQ-ACK signal to the base station on the PUCCH, the HARQ-ACK signal associated with the data signal on the PDSCH.

Example 132 includes the subject matter of Example 131, and optionally, wherein the operations further include processing a dedicated Radio Resource Control signal (RRC signal), the RRC signal indicating a number of configured component carriers including the first component carrier and the second component carrier and a size of a HARQ-ACK aggregation window for the HARQ-ACK signal.

Example 133 includes the subject matter of Example 131, and optionally, wherein the first signal includes a downlink control information (DCI) signal, the operations further including at least one of determine a HARQ-ACK aggregation window size for the HARQ-ACK signal via a NR minimum system information (MSI), NR remaining minimum system information (RMSI), NR other system information (OSI) or radio resource control (RRC) signaling, or determine the HARQ-ACK aggregation window size from a DCI on the PDCCH.

Example 134 includes the subject matter of Example 131, and optionally, wherein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 135 includes the subject matter of Example 134, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured component carriers including the first component carrier and the second component carrier; or always a 1 ms subframe duration.

Example 136 includes the subject matter of Example 131, and optionally, wherein the HARQ-ACK feedback includes an aggregation of HARQ-ACK feedbacks, each of the HARQ-ACK feedbacks on a respective physical uplink control channel (PUCCH) SCell with a corresponding numerology, each of the corresponding numerologies further corresponding to a numerology of a data signal associated with each of the HARQ-ACK feedbacks.

Example 137 includes the subject matter of Example 131, and optionally, wherein the HARQ-ACK feedback is based: on a static HARQ-ACK codebook based on which the size of and order of bits in the HARQ-ACK feedback correspond to all slots of PDSCH; or on a dynamic HARQ-ACK codebook based on which the size of and order of bits in the HARQ-ACK feedback correspond only to scheduled slots of the PDSCH.

Example 138 includes the subject matter of Example 137, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 139 includes the subject matter of Example 138, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 140 includes a method to be performed at least one computer processor of User Equipment (UE), the method including: detecting a physical downlink control channel (PDCCH) on a first component carrier; and decoding a first signal from a base station on the PDCCH, the first signal including downlink control information on resources for a second signal to be transmitted on a second component carrier, wherein the DCI is based on a predetermined numerology, and respective numerologies of the first component carrier and the second component carrier are different from one another, and further wherein a receiver of the second signal is to process the second signal based on the downlink control information in the first signal.

Example 141 includes the subject matter of Example 111, and optionally, wherein the UE is a receiver of the second signal, the downlink control information includes scheduling information regarding a scheduling of the resources for a data signal, the second signal includes the data signal, the method further including: detecting a physical downlink shared channel (PDSCH) on the second component carrier; and decoding the data signal based on the downlink control information.

Example 142 includes the subject matter of Example 111, and optionally, wherein the downlink control information includes scheduling information regarding a scheduling of the resources for a data signal, the second signal is a data signal and the base station is a receiver of the second signal, the method further including: determining a physical uplink shared channel (PUSCH) on the second component carrier; encoding the data signal based on the control information; and causing transmission of the data signal on the PUSCH to a NR evolved Node B (gNB).

Example 143 includes the subject matter of Example 112, and optionally, wherein the downlink control information includes scheduling information regarding a scheduling of the resources for a hybrid automatic repeat request-acknowledge feedback (HARQ-ACK) signal, the second signal includes the HARQ-ACK signal and the UE is a receiver of the second signal, the method further including: detecting a physical downlink shared channel (PDSCH); decoding a data signal for transmission on the PDSCH; determining a physical uplink control channel (PUCCH) on the second component carrier, the PUCCH being on a primary cell (PCell) or on a PUCCH secondary cell (SCell); encoding the HARQ-ACK signal based on the control information, the HARQ-ACK signal associated with the data signal on the PDSCH; and causing transmission of the HARQ-ACK signal on the PUCCH.

Example 144 includes the subject matter of Example 111, and optionally, wherein the downlink control information includes slot indices for transmission of the second signal to indicate slots of the resources.

Example 145 includes the subject matter of Example 115, and optionally, wherein DCI includes a joint resource allocation field to indicate the control information, and the downlink control information includes information on the slots and on symbols within the slots.

Example 146 includes the subject matter of Example 111, and optionally, wherein the downlink control information includes scheduling information regarding a scheduling of the resources for a data signal, the second signal includes the data signal, and a timing between the first signal on the PDCCH and the second signal on a scheduled PDSCH or physical uplink shared channel (PUSCH) is to be configured via higher layer signaling, indicated as a combination of higher layer signaling and dynamic indication in a DCI of the first signal, or explicitly indicated only in the DCI.

Example 147 includes the subject matter of Example 111, and optionally, wherein the downlink control information provides a two-element timing indication regarding the resources, wherein a first timing indication of the two-element timing indication is defined in accordance with the slot a using numerology in a component carrier (CC) where the PDCCH is transmitted, a second timing indication of the two-element timing indication is defined in accordance with a slot using a numerology in the CC where one of PDSCH, Physical Uplink Shared Channel (PUSCH) or Physical Uplink Control Channel (PUCCH) carrying a hybrid automatic repeat request-acknowledge feedback (HARQ-ACK) signal is transmitted.

Example 148 includes the subject matter of Example 111, and optionally, wherein the downlink control information includes scheduling information regarding a scheduling of the resources for a data signal, the second signal includes the data signal, and the downlink control information comprises mini-slot information including symbol indices to indicate symbols of the resources.

Example 149 includes the subject matter of any one of Examples 111-113, wherein the resources include at least one of slot indices of the resources, symbol indices of the resources, or a timing indication, the predetermined numerology being defined in accordance with: one subframe boundary; a slot boundary using a smallest numerology in the first component carrier and the second component carrier; a numerology in a component carrier where the PDCCH or the data signal is transmitted; or always a 15 kHz numerology.

Example 150 includes the subject matter of any one of Examples 111-113, wherein: the downlink control information includes scheduling information regarding a scheduling of the resources for a data signal, the scheduling information including a timing indication; and wherein the timing indication includes an indication of a timing delay between an end of the PDCCH and the data signal, the predetermined numerology for indication of the timing delay based on a numerology of the data signal.

Example 151 includes the subject matter of Example 114, and optionally, wherein the resources include a timing indication, the predetermined numerology being defined in accordance with: one subframe boundary; a slot boundary using a smallest numerology in the first component carrier and the second component carrier; a numerology in a component carrier where the PDSCH or the physical uplink control channel (PUCCH) is transmitted; or always a 15 kHz numerology.

Example 152 includes the subject matter of Example 114, and optionally, wherein: the scheduling information includes a timing indication; the first signal includes a downlink control information signal (DCI) on a PDCCH; and wherein the timing indication includes an indication of a timing delay, the predetermined numerology for indication of the timing delay based on a numerology of the PUCCH.

Example 153 includes the subject matter of Example 111, and optionally, wherein: the downlink control information includes scheduling information regarding a scheduling of the resources for a data signal; the second signal includes the data signal; and the resources include multiple slots.

Example 154 includes the subject matter of Example 124, and optionally, wherein the downlink control information includes slot group indices to indicate respective groups of slots of the multiple slots.

Example 155 includes the subject matter of Example 124, and optionally, wherein: the first signal includes a first stage downlink control information signal (DCI) on the PDCCH; the downlink control information is a first stage DCI; the method further including: decoding a second stage DCI on the PDSCH, the second stage DCI including second stage DCI on the resources; and decoding the data signal based on the first stage DCI and the second stage DCI.

Example 156 includes the subject matter of any one of Examples 112-113, wherein the PDCCH is to schedule the data signal at high band, and wherein the downlink control information includes at least one of a beam pair link index, configuration parameters of a phase tracking reference signal (PT-RS) or an indication of a Sounding Reference Signal (SRS) resource (SRI).

Example 157 includes the subject matter of Example 111, and optionally, wherein the resources include a size of and order of bits in a hybrid automatic repeat request-acknowledge feedback (HARQ-ACK) signal, the second signal includes the HARQ-ACK signal and the base station is a receiver of the second signal, the method further including: detecting a physical downlink shared channel (PDSCH); decoding a data signal on the PDSCH; determining a physical uplink control channel (PUCCH) on the second component carrier, the PUCCH being on a primary cell (PCell) or on a PUCCH secondary cell (SCell); encoding the HARQ-ACK signal based on the control information; and causing transmission of the HARQ-ACK signal to the base station on the PUCCH, the HARQ-ACK signal associated with the data signal on the PDSCH.

Example 158 includes the subject matter of Example 128, and optionally, wherein the method further includes processing a dedicated Radio Resource Control signal (RRC signal), the RRC signal indicating a number of configured component carriers including the first component carrier and the second component carrier and a size of a HARQ-ACK aggregation window for the HARQ-ACK signal.

Example 159 includes the subject matter of Example 128, and optionally, wherein the first signal includes a downlink control information (DCI) signal, the method further including at least one of determining a HARQ-ACK aggregation window size for the HARQ-ACK signal via a NR minimum system information (MSI), NR remaining minimum system information (RMSI), NR other system information (OSI) or radio resource control (RRC) signaling, or determining the HARQ-ACK aggregation window size from a DCI on the PDCCH.

Example 160 includes the subject matter of Example 128 wand optionally, herein the order of bits in the HARQ-ACK signal corresponds to an order of resources in the PDSCH incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

Example 161 includes the subject matter of Example 131, and optionally, wherein the DCI is based on a HARQ-ACK aggregation window size for the HARQ-ACK signal, and wherein the HARQ-ACK aggregation window size is based on the predetermined numerology, the predetermined numerology being defined in accordance with: a smallest subcarrier spacing among configured shared component carriers including the first component carrier and the second component carrier; or always a 1 ms subframe duration.

Example 162 includes the subject matter of Example 128, and optionally, wherein the HARQ-ACK feedback includes an aggregation of HARQ-ACK feedbacks, each of the HARQ-ACK feedbacks on a respective physical uplink control channel (PUCCH) SCell with a corresponding numerology, each of the corresponding numerologies further corresponding to a numerology of a data signal associated with each of the HARQ-ACK feedbacks.

Example 163 includes the subject matter of Example 128, and optionally, wherein the HARQ-ACK feedback is based: on a static HARQ-ACK codebook based on which the size of and order of bits in the HARQ-ACK feedback correspond to all slots of PDSCH; or a dynamic HARQ-ACK codebook based on which the size of and order of bits in the HARQ-ACK feedback correspond only to scheduled slots of the PDSCH.

Example 164 includes the subject matter of Example 134, and optionally, wherein, when the HARQ-ACK feedback is based on the dynamic HARQ-ACK codebook, the downlink control information includes information on a counter downlink assignment index (C-DAI) and total downlink assignment index (T-DAI) corresponding to the PSDCH.

Example 165 includes the subject matter of Example 135, and optionally, wherein the C-DAI is incremented, for both time division duplex (TDD) and frequency division duplex (FDD): in a time first frequency second manner; in a frequency first time second manner; or in a hybrid manner including a time first manner, and then, after reaching a lot boundary, incremented in a frequency manner through all configured CC, then incremented again in the hybrid manner until an end of a corresponding subframe for the PDSCH.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

What is claimed is:

1. An apparatus of a New Radio (NR) User Equipment, the apparatus including a radio frequency (RF) circuitry interface, and processing circuitry coupled to the RF interface and configured to:
   decode control information from a New Radio (NR) evolved Node B (gNode B), the control information including Hybrid automatic repeat request-acknowledge feedback (HARQ-ACK) codebook information for a HARQ-ACK signal in a physical uplink control channel (PUCCH) from the UE to the gNode B;
   decode physical downlink shared channel (PDSCH) transmissions from the gNode B; and
   encode the HARQ-ACK signal for transmission to the gNode B based on the control information and based on the PDSCH;
   wherein the HARQ-ACK codebook information includes information on a size of a HARQ-ACK aggregation window for the HARQ-ACK signal; and
   wherein the control information is in at least one of a downlink control information (DCI) or radio resource control (RRC) signaling, the processing circuitry to configure the size of the HARQ-ACK aggregation window based on at least one of a decoding of the DCI, or the radio resource control (RRC) signaling.

2. The apparatus of claim 1, wherein the HARQ-ACK codebook information is based on one of a dynamic HARQ-ACK codebook and a semi-static HARQ-ACK codebook.

3. The apparatus of claim 2, wherein:
   the HARQ-ACK codebook information is based on the dynamic HARQ-ACK codebook;
   the control information is in the DCI, and includes information on a downlink assignment index (DAI) and on a total downlink assignment index (T-DAI);
   the DAI and the T-DAI have respective values increasing in a frequency-first time-second manner and corresponding to the PDSCH transmissions.

4. The apparatus of claim 1, the processing circuitry to decode a physical downlink control channel (PDCCH) including the control information, the control information including information on a timing delay between the PDCCH and the PDSCH, or a timing delay between the PDCCH and a PUSCH to be sent by the UE to the gNode B and corresponding to the control information.

5. The apparatus of claim 4, wherein the timing delay is based on a smallest subcarrier spacing as between two respective component carriers (CCs) for the PDCCH on one hand, and one of the PDSCH or PUSCH on another hand.

6. The apparatus of claim 1, further comprising a front-end module coupled to the processing circuitry.

7. The apparatus of claim 6, further comprising at least one antenna coupled to the front-end module.

8. A product comprising one or more tangible computer-readable non-transitory storage media comprising computer-executable instructions operable to, when executed by at least one computer processor of a New Radio (NR) evolved Node B (gNode B), enable the at least one computer processor to perform operations including:
   encode control information for transmission to a NR User Equipment (UE), the control information including Hybrid automatic repeat request-acknowledge feedback (HARQ-ACK) codebook information for a HARQ-ACK signal in a physical uplink control channel (PUCCH) from the UE to the gNode B;
   encode physical downlink shared channel (PDSCH) transmissions to the UE based on the control information; and
   decode the HARQ-ACK signal from the UE;
   wherein the HARQ-ACK codebook information includes information on a size of a HARQ-ACK aggregation window for the HARQ-ACK signal; and
   wherein the control information is in at least one of a downlink control information (DCI) or radio resource control (RRC) signaling, the control information to be decodable by the UE for the UE to determine the size of the HARQ-ACK aggregation window based on at least one of a decoding of the DCI, or the radio resource control (RRC) signaling.

9. The product of claim 8, wherein the HARQ-ACK codebook information is based on one of a dynamic HARQ-ACK codebook and a semi-static HARQ-ACK codebook.

10. The product of claim 9, wherein:
    the HARQ-ACK codebook information is based on the dynamic HARQ-ACK codebook;
    the control information is in the DCI, and includes information on a downlink assignment index (DAI) and on a total downlink assignment index (T-DAI); and
    the DAI and the T-DAI have respective values increasing in a frequency-first time-second manner and corresponding to the PDSCH transmissions.

11. The product of claim 8, the operations further including encoding a physical downlink control channel (PDCCH) including the control information, the control information including information on a timing delay between the PDCCH and the PDSCH, or a timing delay between the PDCCH and a PUSCH to be sent by the UE to the gNode B and corresponding to the control information.

12. The product of claim 11, wherein the timing delay is based on a smallest subcarrier spacing as between two respective component carriers (CCs) for the PDCCH on one hand, and one of the PDSCH or PUSCH on another hand.

13. A system including:
    means for decoding control information from a New Radio (NR) evolved Node B (gNode B), the control information including Hybrid automatic repeat request-acknowledge feedback (HARQ-ACK) codebook information for a HARQ-ACK signal in a physical uplink control channel (PUCCH) from the UE to the gNode B;
    means for decoding physical downlink shared channel (PDSCH) transmissions from the gNode B; and
    means for encoding the HARQ-ACK signal for transmission to the gNode B based on the control information and based on the PDSCH;

wherein the HARQ-ACK codebook information includes information on a size of a HARQ-ACK aggregation window for the HARQ-ACK signal;

wherein the control information is in at least one of a downlink control information (DCI) or radio resource control (RRC) signaling;

wherein the apparatus further includes means for configuring the size of the HARQ-ACK aggregation window based on at least one of a decoding of the DCI, or the radio resource control (RRC) signaling.

14. The system of claim 13, wherein the HARQ-ACK codebook information is based on one of a dynamic HARQ-ACK codebook and a semi-static HARQ-ACK codebook.

15. The system of claim 14, wherein:
the HARQ-ACK codebook information is based on the dynamic HARQ-ACK codebook;
the control information is in the DCI, and includes information on a downlink assignment index (DAI) and on a total downlink assignment index (T-DAI);
the DAI and the T-DAI have respective values increasing in a frequency-first time-second manner and corresponding to the PDSCH transmissions.

16. The system of claim 13, further including means for decoding a physical downlink control channel (PDCCH) including the control information, the control information including information on a timing delay between the PDCCH and the PDSCH, or a timing delay between the PDCCH and a PUSCH to be sent by the UE to the gNode B and corresponding to the control information.

17. The system of claim 16, wherein the timing delay is based on a smallest subcarrier spacing as between two respective component carriers (CCs) for the PDCCH on one hand, and one of the PDSCH or PUSCH on another hand.

18. An apparatus of a New Radio (NR) evolved Node B (gNode B), the apparatus including a radio frequency (RF) circuitry interface, and processing circuitry coupled to the RF interface and configured to:
encode control information for transmission to a NR User Equipment (UE), the control information including Hybrid automatic repeat request-acknowledge feedback (HARQ-ACK) codebook information for a HARQ-ACK signal in a physical uplink control channel (PUCCH) from the UE to the gNode B;
encode physical downlink shared channel (PDSCH) transmissions to the UE based on the control information; and
decode the HARQ-ACK signal from the UE;
wherein the HARQ-ACK codebook information includes information on a size of a HARQ-ACK aggregation window for the HARQ-ACK signal; and
wherein the control information is in at least one of a downlink control information (DCI) or radio resource control (RRC) signaling, the control information to be decodable by the UE for the UE to determine the size of the HARQ-ACK aggregation window based on at least one of a decoding of the DCI, or the radio resource control (RRC) signaling.

19. The apparatus of claim 18, wherein the HARQ-ACK codebook information is based on one of a dynamic HARQ-ACK codebook and a semi-static HARQ-ACK codebook.

20. The apparatus of claim 19, wherein:
the HARQ-ACK codebook information is based on the dynamic HARQ-ACK codebook;
the control information is in the DCI, and includes information on a downlink assignment index (DAI) and on a total downlink assignment index (T-DAI); and
the DAI and the T-DAI have respective values increasing in a frequency-first time-second manner and corresponding to the PDSCH transmissions.

21. The apparatus of claim 18, the processing circuitry to decode a physical downlink control channel (PDCCH) including the control information, the control information including information on a timing delay between the PDCCH and the PDSCH, or a timing delay between the PDCCH and a PUSCH to be sent by the UE to the gNode B and corresponding to the control information.

22. The apparatus of claim 18, further comprising a front-end module coupled to the processing circuitry.

23. The apparatus of claim 22, further comprising at least one antenna coupled to the front-end module.

* * * * *